United States Patent
Leung et al.

(10) Patent No.: US 9,237,014 B2
(45) Date of Patent: Jan. 12, 2016

(54) PARTIAL CIPHERTEXT UPDATES USING VARIABLE-LENGTH SEGMENTS DELINEATED BY PATTERN MATCHING AND ENCRYPTED BY FIXED-LENGTH BLOCKS

(71) Applicant: Hong Kong Applied Science & Technology Research Institute Company Limited, Hong Kong (HK)

(72) Inventors: Wing Pan Leung, Hong Kong (HK); Yiu Wing Wat, Hong Kong (HK)

(73) Assignee: Hong Kong Applied Science & Technology Research Institute Company, Limited, Hong Kong (HK)

(*) Notice: Subject to any disclaimer, the term of this patent is extended or adjusted under 35 U.S.C. 154(b) by 344 days.

(21) Appl. No.: 13/903,114

(22) Filed: May 28, 2013

(65) Prior Publication Data

US 2014/0355754 A1    Dec. 4, 2014

(51) Int. Cl.
*H04L 29/06*    (2006.01)
*H04L 9/28*    (2006.01)
*H04L 9/06*    (2006.01)

(52) U.S. Cl.
CPC ........ *H04L 9/28* (2013.01); *H04L 9/065* (2013.01); *H04L 9/0631* (2013.01); *H04L 9/0643* (2013.01)

(58) Field of Classification Search
CPC ....... H04L 9/28; H04L 9/0643; H04L 9/0631; H04L 6/065
See application file for complete search history.

(56) References Cited

U.S. PATENT DOCUMENTS

| | | | |
|---|---|---|---|
| 5,956,504 A | 9/1999 | Jagadish et al. | |
| 6,667,700 B1 * | 12/2003 | McCanne et al. | ............... 341/51 |
| 7,894,599 B2 | 2/2011 | Rigler | |

(Continued)

FOREIGN PATENT DOCUMENTS

| | | |
|---|---|---|
| CN | 101808095 A | 8/2010 |
| WO | 2010144123 A1 | 12/2010 |
| WO | WO 2010144123 A1 * | 12/2010 |

OTHER PUBLICATIONS

Krista Bennett, et al., "Efficient Sharing of Encrypted Data", Information Security and Privacy, Lecture Notes in Computer Science, vol. 2384, 2002, pp. 107-120.

(Continued)

*Primary Examiner* — Fatoumata Traore
*Assistant Examiner* — Kendall Dolly
(74) *Attorney, Agent, or Firm* — Stuart T. Auvinen; gPatent LLC

(57) ABSTRACT

A re-encryptor compares hashed digests of updated segments and original segments to located changed segments that must be re-encrypted. A new initialization vector is input to a block cipher engine for each changed segment. Since only changed segments need to be re-encrypted, transmission bandwidth to remote encrypted storage may be reduced. The amount of cipher text that is changed by a single update is reduced to a segment. Segments have a variable length and are bound by bits matching a segment delimiter. Each segment may have many fixed-length blocks that are encrypted by the block cipher engine with the same initialization vector for that segment. The segment delimiter is a randomly-generated word that is included with the initialization vectors in the metadata. Variable-length segments limit update disruption of the cipher text while fixed-length blocks are more efficiently encrypted. Combining segments and blocks provides for better re-encryption of updates.

17 Claims, 19 Drawing Sheets

(56) References Cited

U.S. PATENT DOCUMENTS

2004/0199669 A1    10/2004  Riggs et al.
2007/0237327 A1*   10/2007  Taylor et al. ................... 380/37
2010/0325422 A1    12/2010  Gnanasambandam et al.
2012/0191969 A1     7/2012  Clifford et al.

OTHER PUBLICATIONS

Gansen Zhao, et al., "Deliverance from trust through a Redundant Array of Independent Net-storages in Cloud Computing", IEEE Conference on Computer Communications Workshops, INFOCOM, 2011, pp. 631-636.

\* cited by examiner

CLEAR TEXT -> CIPHER TEXT

"abf?f234" -> UuE0KHa8yp

"Abf?f234" -> cMWceJsjgo6

PRIOR ART

FIG. 1

"abf?f234" -> PcVRvbMtdS6

"Abf?f234" -> V/2jvbMtdS6

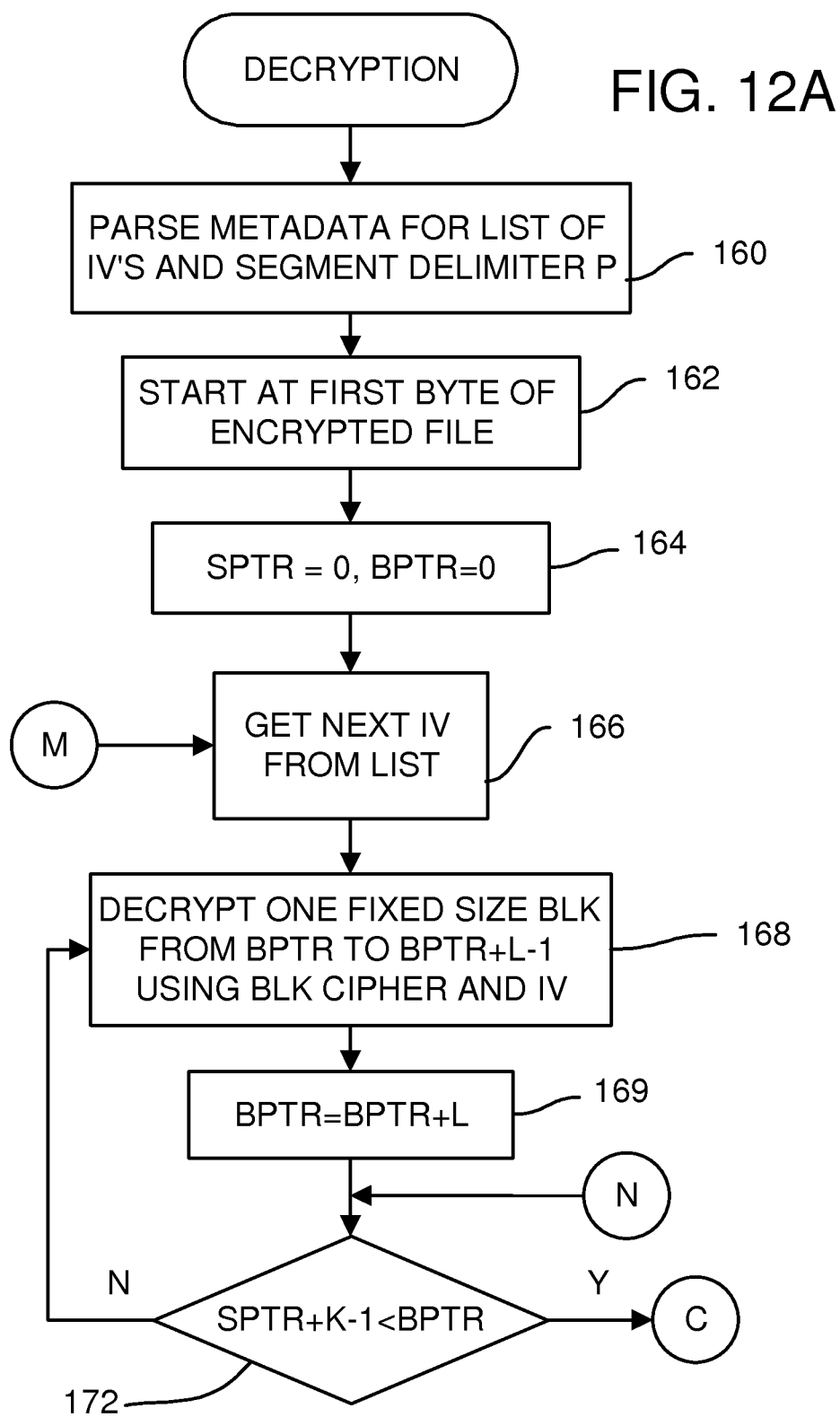

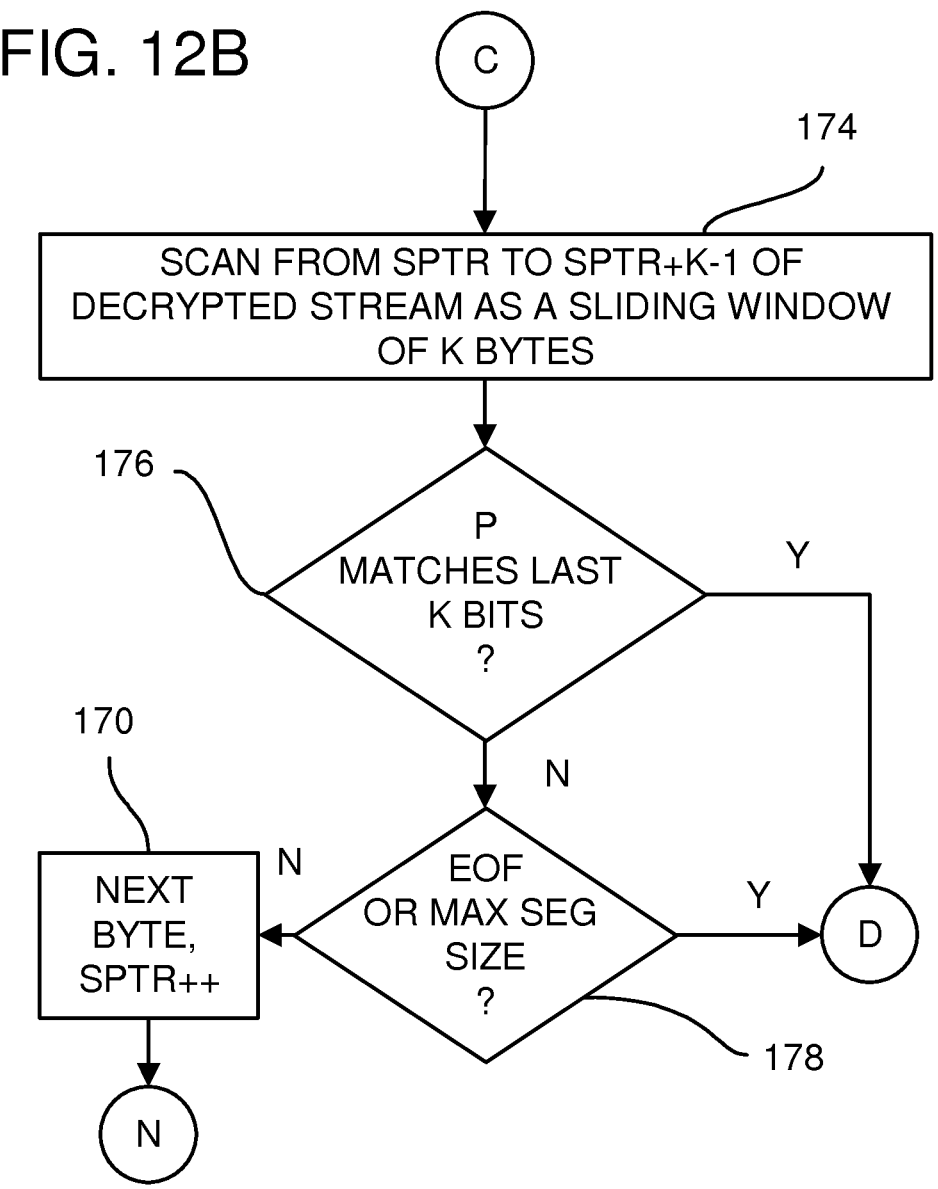

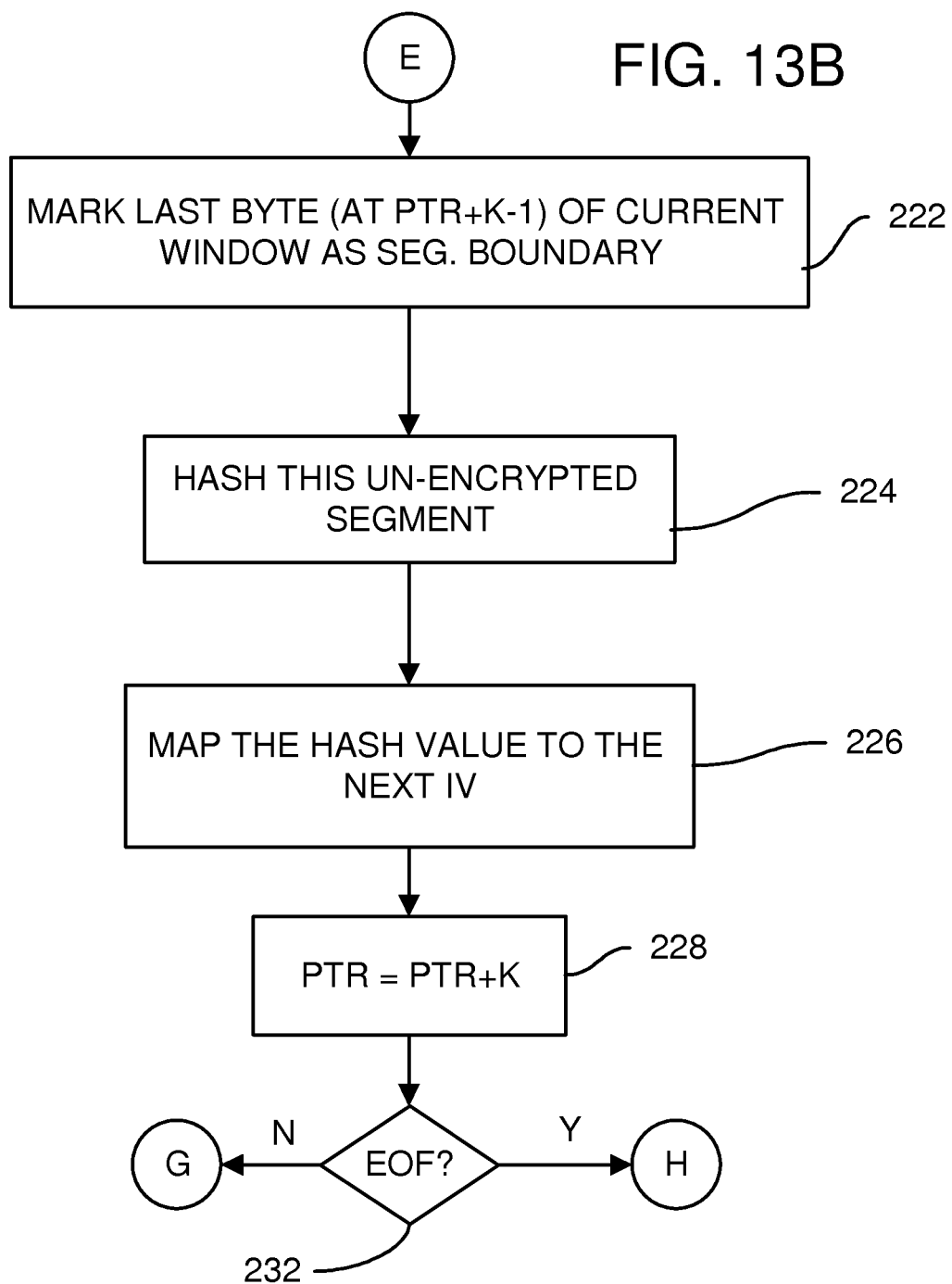

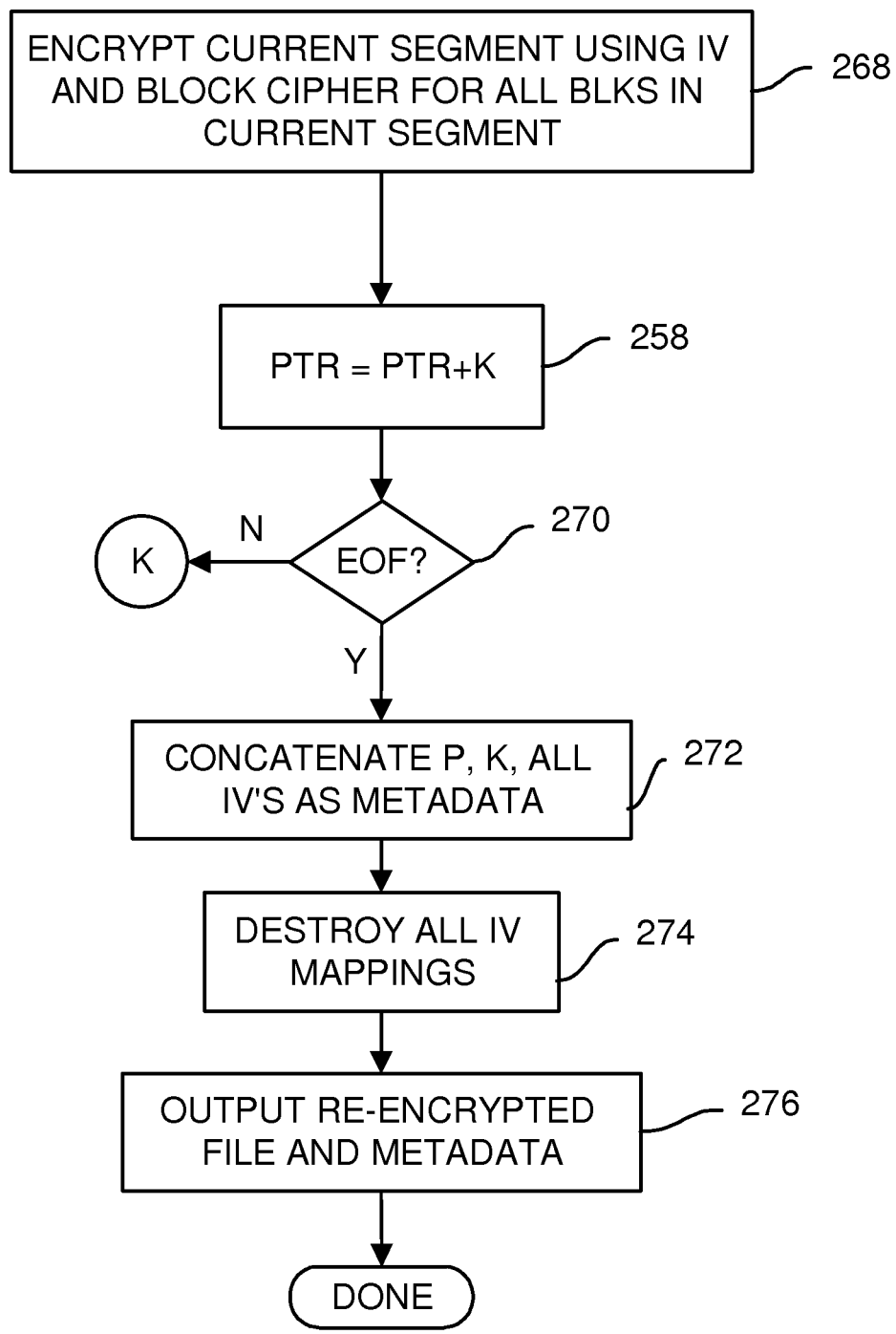

PARTIAL CIPHERTEXT UPDATES USING VARIABLE-LENGTH SEGMENTS DELINEATED BY PATTERN MATCHING AND ENCRYPTED BY FIXED-LENGTH BLOCKS

FIELD OF THE INVENTION

This invention relates to encryption systems, and more particularly to re-encryption of partially updated messages using variable-length segments and fixed-sized cipher blocks.

BACKGROUND OF THE INVENTION

Encryption is a common way to secure data, whether the data is sent over a non-secure network such as the Internet, or is stored remotely where security breaches might occur. Many encryption systems and standards are known. While such existing encryption systems are effective, such systems are not always efficient.

Cloud-based storage has become popular today. Rather than store documents and files locally, such as on personal computers or servers at a company premesis, the documents and files are stored or backed up at a remote location. When a user wishes to update a document, the user fetches the document from the remote storage, makes the updates, and sends the updated document back to the remote storage location.

The remote storage is typically accessed through the Internet. For security, the documents and files may be stored in an encrypted format at the remote storage location. The remote storage sends an encrypted document to the user, who then decrypts the document, makes the updates, and re-encrypts the document. The re-encrypted document is then sent over the Internet to the remote storage.

FIG. 1 highlights that prior-art encryption of a small change in clear text usually results in a large change in the encrypted cipher text. Sometimes only a small portion of encrypted data is changed, such as when a user updates a single sentence in a large document that is stored remotely.

FIG. 1 shows that the user made a small change in the unencrypted plain text or clear text, such as by changing the first letter from a lower-case "a" to a capital "A". The rest of the document is unchanged.

In a traditional encryption system, once the updates are made and saved by the user, the entire document is encrypted again and new encrypted cipher text is generated. The new cipher text is typically completely different from the original cipher text. For example, the original clear text is encrypted to the string "UuEOKHa8yp" while the updated cipher text is encrypted to the string "cMWceJsjgo6".

While such a complete change in cipher text is secure, it typically requires that the new cipher text for the whole document be re-transmitted to the remote storage location. Thus a small change in a document requires that a large amount of encrypted data be transmitted over limited-bandwidth networks.

What is desired is an encryption system that more efficiently updates encrypted cipher text. A re-encryption system is desired that changes only a portion of the cipher text, allowing a partial update of cipher text to be transmitted over networks for remote storage. A re-encryption system is desired that locates a segment of changed text within a sequence of encrypted blocks, and then re-encrypts only that changed segment. An encryption system that uses fixed-size cipher blocks and variable-sized segments is desired.

BRIEF DESCRIPTION OF THE DRAWINGS

FIG. 1 highlights that prior-art encryption of a small change in clear text usually results in a large change in the encrypted cipher text.

FIG. 2 shows an efficient re-encryption system that encrypts only differential changes.

FIGS. 12A-C show a decryption process using variable-length segmentation and a fixed-block cipher.

FIGS. 13A-E show a re-encryption process that detects updated segments using hash digests.

DETAILED DESCRIPTION

The present invention relates to an improvement in encryption. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

FIG. 2 shows an efficient re-encryption system that encrypts only differential changes. The inventors have developed a re-encryption system that observes differential changes in the clear text to create efficiently updated cipher text. In this example, the original clear text is encrypted to the string "PcVRvbMtdS6" while the updated cipher text is encrypted to the string "V/2jvbMtdS6". Only the first four characters in the encrypted string are changed. The remaining 7 characters are unchanged.

Rather that re-transmit and re-store all 11 encrypted characters, only the 4 changed characters might be sent to the remote storage. Since the majority of the encrypted string is unchanged, various methods may be used to exploit this update efficiency to increase efficiency of various other systems. For example, a remote storage system may store only the changed characters and not the unchanged characters. A transmission system may transmit only the changed characters, reducing required bandwidth. Tables, maps, linked lists, and other methods may be used to link the updated characters to their positions in the original cipher text so that the full string with the updates may be reconstructed. Storage update efficiency of encrypted data storage may thus be improved.

Figure 3:
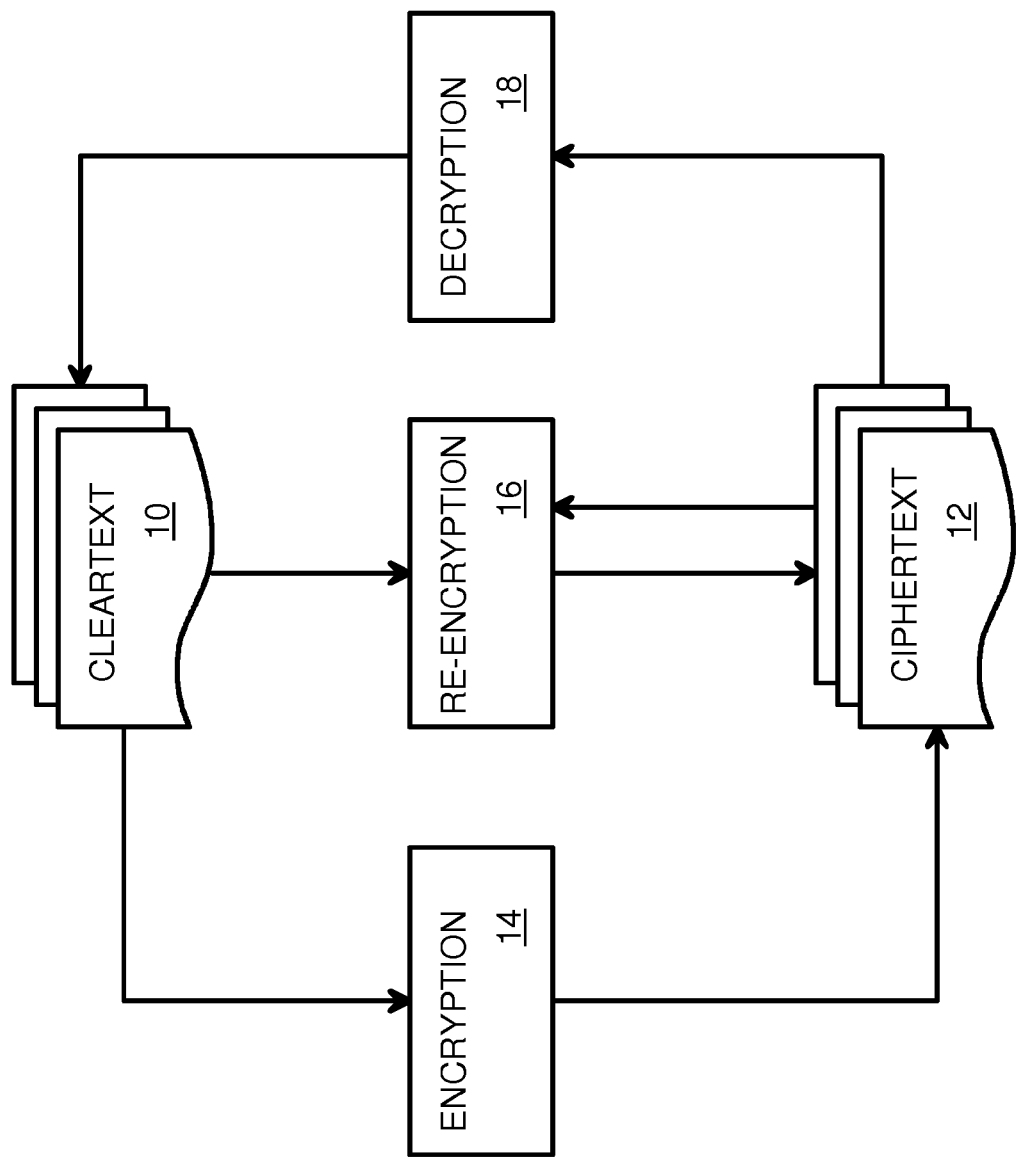
FIG. 3 shows a re-encryption system.

FIG. 3 shows a re-encryption system. Clear text 10 is data such as document files from a word processor program. Clear text 10 is considered to be non-encrypted and non-secure, even when a program such as word processor performs some program-specific encryption or scrambling. Clear text 10 may be ASCII characters for simple programs such as text editors, although program-specific data may be embedded.

Encryption routine 14 takes clear text 10, performs encryption, and outputs cipher text 12, which is in an encrypted format and is considered secure. Cipher text 12 may be transmitted over the Internet and stored by a remote cloud-based storage service.

Decryption routine 18 takes cipher text 12, performs decryption, and outputs clear text 10. Re-encryption routine 16 takes cipher text 12 as an input, and updated clear text 10 as a second input. Re-encryption routine 16 encrypts updated clear text 10 and compares updated encrypted segments to original encrypted segments from cipher text 12 to locate differences. The updated encrypted segments are output from re-encryption routine 16 as the newly updated cipher text 12.

Encryption routine 14, decryption routine 18, and re-encryption routine 16 may execute on the user's computer, or on a company server, so that cipher text 12 is generated before being transmitted to a remote storage.

Figure 4:
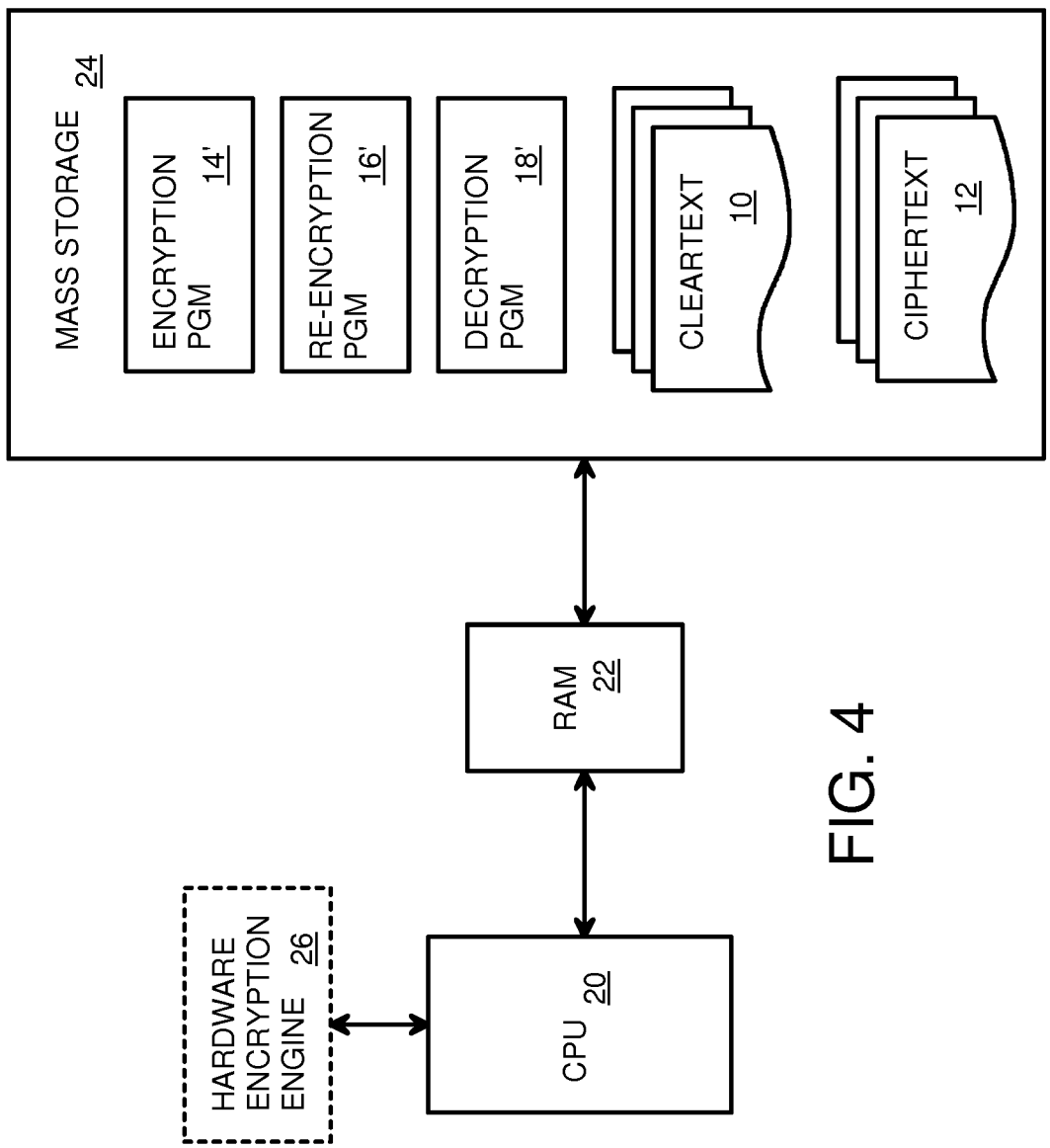
FIG. 4 shows a local computer programmed for re-encryption.

FIG. 4 shows a local computer programmed for re-encryption. Mass storage 24 may be a local storage device such as a Hard Disk Drive (HDD), a flash drive, optical drive, or a server storage. When a user receives cipher text 12, such as from a remote storage server, decryption routine 18' is loaded from mass storage 24 to local memory 22, which may be a dynamic-random-access memory (DRAM) that central processing unit (CPU) 20 reads for data and instructions to execute. CPU 20 executes the instructions in decryption routine 18' and decrypts cipher text 12, which is copied from mass storage 24 to local memory 22. Clear text 10 is created in local memory 22 and copied to mass storage 24. Encryption routine 14' and re-encryption routine 16' may also be executed in a similar manner. Rather than perform all encryption steps in software, hardware encryption engine 26 may be activated by the routines to accelerate various encryption functions.

Standard encryption methods would produce the large changes in the cipher text, as shown in FIG. 1. The inventors' encryption method produces a smaller change in the cipher text by using a novel method that combines variable-length segments and fixed-size blocks. While data segmentation is often used for non-encrypted data, having variable-length segments of encrypted data is uncommon. Many cryptography systems used fixed-size encrypted blocks or multiples of these blocks, not variable-size encrypted segments. The inventors locate updated variable-length encrypted segments and then re-encrypt fixed-size blocks of clear text that form these updated encrypted segments.

Figure 5:
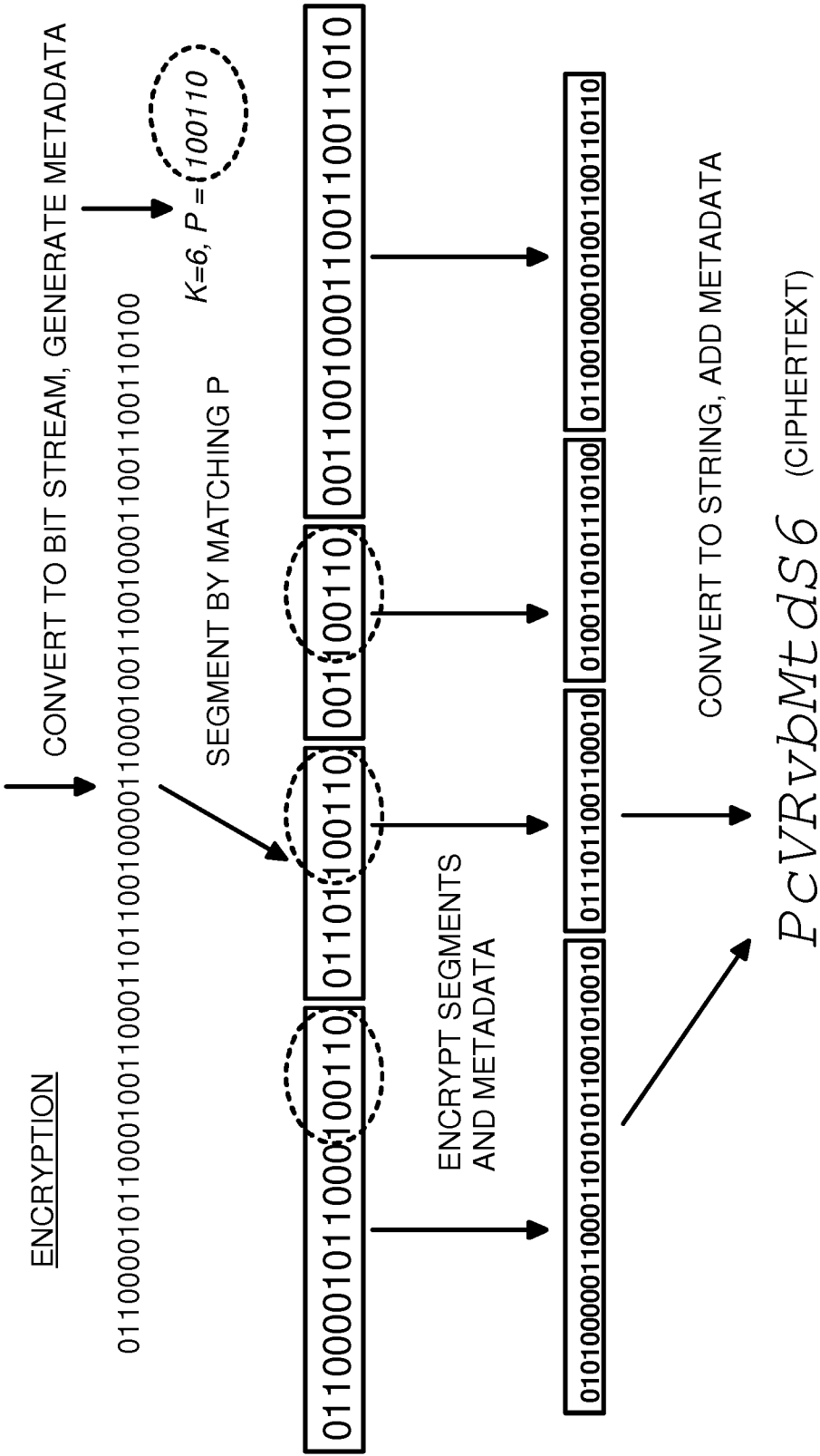
FIG. 5 highlights encryption of variable-length segments using a fixed-length block cipher.

FIG. 5 highlights encryption of variable-length segments using a fixed-length block cipher. A clear text string is converted to a bit stream, such as by converting ASCII characters to binary format. Metadata that is used to control the encryption process is generated. This generated metadata includes a segment delimiter (P), and the length of the segment delimiter (K bits). An example of a 6-bit segment delimiter (100110) is shown. Thus P=100110 and K=6 in this example.

The clear text bit stream is parsed from left to right to search for bits that match the segment delimiter, such as shown by the dashed ovals in FIG. 5. Once a match is found, the bits up to and including the segment delimiter are formed into a segment. A new segment begins after the segment delimiter bits are found. Thus the bit stream is divided into segments by the segment delimiter. Since bits that match the segment delimiter might appear anywhere within the bit stream, the size of the resulting segments is variable and even random.

The last segment does not necessarily end with the segment delimiter, and there may be a maximum segment size imposed, so that some large segments might not end with the segment delimiter. Padding could be added or ciphertext stealing used.

After the clear-text bit stream is segmented by matching with the segment delimiter, each segment is encrypted. Each segment is encrypted using one or more block ciphers. The block ciphers have a fixed length, such as an Advanced Encryption Standard (AES)-128 cipher of 128 bits. Each block cipher needs a random-number input, known as an initialization vector. The same initialization vector is used for all blocks within a segment, but the initialization vector is changed for each new segment.

Once all fixed-size blocks in all variable-length segments are encrypted, the encrypted bit stream may be converted to a character string and the metadata added to produce the cipher text. The metadata may itself be encrypted using a variety of methods. The random initialization vectors for each segment may be included in the metadata.

Figure 6:
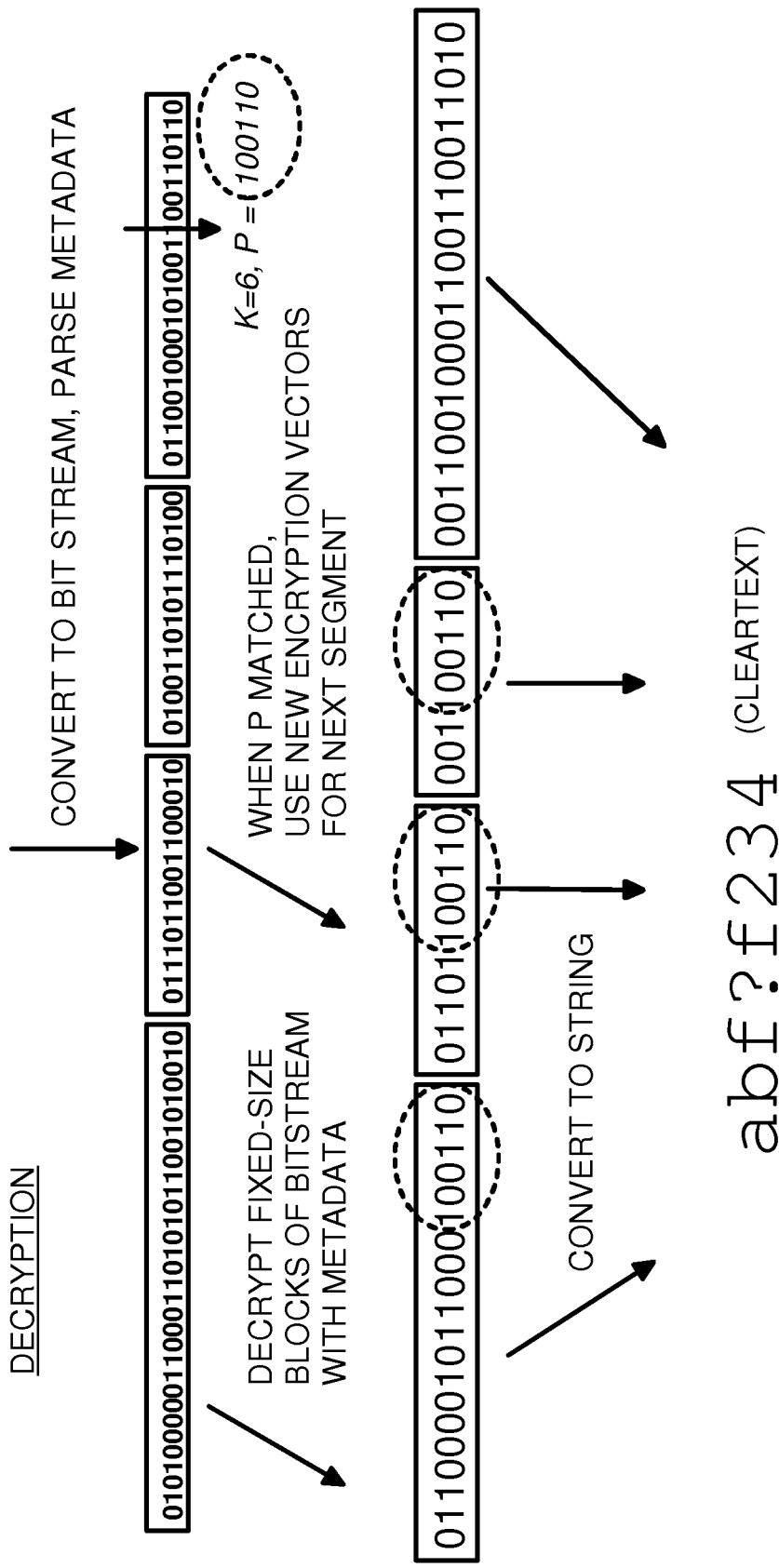
FIG. 6 highlights decryption of variable-length segments using a fixed-length block cipher.

FIG. 6 highlights decryption of variable-length segments using a fixed-length block cipher. The encrypted data or cipher text is converted from a character stream to a bit stream if necessary. The bit stream is parsed for metadata. The extracted metadata includes the segment delimiter P and the number of bits in the segment delimiter, K, and the initialization vectors. A mapping of the initialization vectors to the segments may also be included in the metadata, or the mapping may be implied.

The first initialization vector is used to decrypt the first cipher block in the encrypted bit stream. The clear text bits generated by the block cipher decryption are compared to the segment delimiter. If no match is found, the next block is decrypted using the same initialization vector, and additional blocks are decrypted until a match is found with the segment delimiter.

Once decrypted bits that match the segment delimiter are found, the segment boundary is marked and a new segment begins. A different initialization vector is selected from the metadata and used for decryption of the block ciphers in this next segment. One or more fixed-length blocks are decrypted until a match is found with the segment delimiter.

Each new segment is found by matching with the segment delimiter, or once a maximum segment length is reached. The final segment ends at the last bit of the decrypted bit stream. The decrypted bit stream is converted to a character string if needed and output as the clear text.

Since each segment has a different initialization vector, the segment boundaries must be located correctly for the fixed-length block ciphers to decrypt correctly. The segment boundaries are located by finding bits that match the segment delimiter, as shown by the dashed ovals in FIG. 6. Using fixed-length blocks for the actual encryption/decryption provides for a more efficient encryption engine than if variable-length segments were encrypted and decrypted directly. The combination of fixed-length blocks and variable-length segments is efficient yet produces smaller changes in the cipher text when the clear text is updated, since unchanged segments have the same cipher text.

Figure 7:
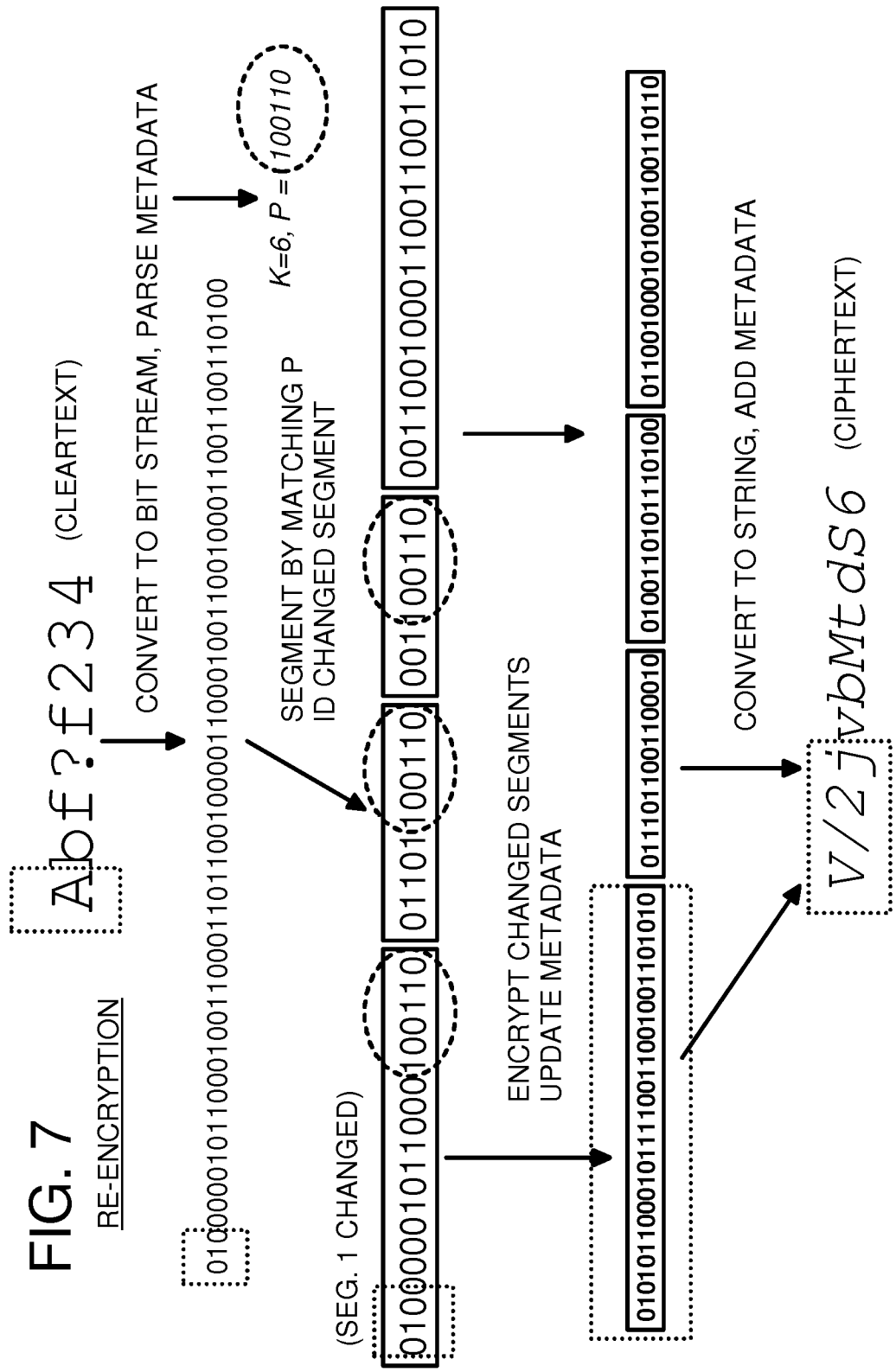
FIG. 7 highlights re-encryption of variable-length segments using a fixed-length block cipher where only changed segments are encrypted again.

FIG. 7 highlights re-encryption of variable-length segments using a fixed-length block cipher where only changed segments are encrypted again. In FIG. 7, the user updated the clear text so that only the first character was changed, from a lower-case "a" to an upper-case "A". The update is shown in the clear text and as it propagates through re-encryption as a dashed box.

The updated clear text is converted to a bit stream and the metadata from the encrypted stream is parsed to obtain the metadata used when the old clear text was originally encrypted. The metadata includes the segment delimiter, which is compared to the updated clear text bit stream from left to right until a match is found, as indicated by the dashed ovals. Each match of the segment delimiter marks the end of a segment.

A digest such as a hash may be generated for each segment, both from the old encrypted stream and from the updated encrypted stream. When the hashes mis-match for a segment, that segment is identified as a changed segment. Alternately, all bits in an updated segment may be compared to all bits in the original segment to detect a changed segment.

The segments that were changed are encrypted again using the block cipher and the initialization vectors for those segments obtained from the metadata. Segments that having matching digests and were not changed do not need to be encrypted again. The changed encrypted segments are merged with other unchanged encrypted segments to form the encrypted bit stream, which may be converted to a character stream and output as the cipher text. Alternately, just the changed encrypted segments may be outputted and transmitted, along with some indication of their location within the original bit stream, such as by including a segment number or the initialization vector for each changed segment.

Since only changed segments need to be encrypted, transmitted, and stored, the method is more efficient for the CPU, networks, and storage systems. Security is maintained since each segment has a different initialization vector. The segment boundaries must be located correctly for correct initialization vector to be selected so that the fixed-length block ciphers decrypt correctly. The computational efficiency of the fixed-length block ciphers is retained while still using variable-length segments. The combination of variable-length segments and fixed-length ciphers is computationally efficient yet also allows for updating of just the changed segments during re-encryption.

Figure 8:
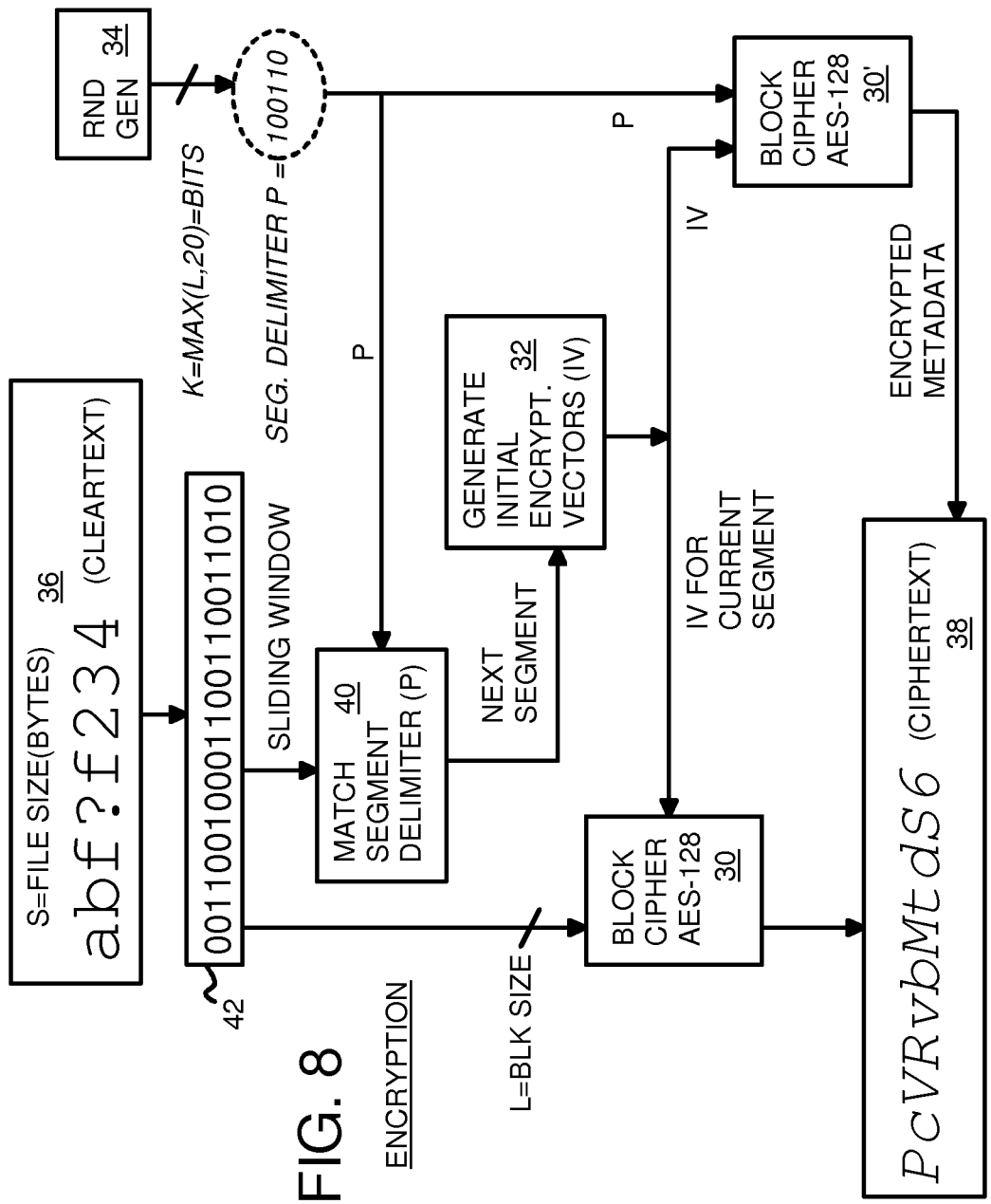
FIG. 8 is a block diagram of a variable-segment fixed-block encryptor.

FIG. 8 is a block diagram of a variable-segment fixed-block encryptor. Clear text file 36 contains the input clear text, which has a file size of S bytes. Sliding window 42 takes a group of bits from clear text file 36 in a window that slides to the right as the clear text file 36 is encrypted. K bits from sliding window 42 are sent to comparator 40 for comparison to the K-bit segment delimiter. The segment delimiter P is generated by random number generator 34 as a K-bit value, where K is the maximum of L, the block size in bytes of the block cipher, and 20. Thus segment delimiter P is never less than 20 bits in length. The segment delimiter P is generated once for each clear text file 36.

When segment delimiter P matches the last K bits from sliding window 42, comparator 40 activates a next segment signal, causing initialization vector generator 32 to generate a new initialization vector (IV) for the next block. Pipelining delays within initialization vector generator 32 keep the current block's initialization vector (IV) until after block cipher engine 30 has finished encrypting all data from the current segment. The prior IV is used by block cipher engine 30 to encrypt the last L or fewer bytes from sliding window 42. Block cipher engine 30 outputs the encrypted bytes to cipher text file 38.

When the segment delimiter has not yet been matched for the current segment by comparator 40, but L bytes have been processed by sliding window 42, block cipher engine 30 encrypts another block of L bytes from the current segment and outputs its encrypted bytes into cipher text file 38. Thus several fixed-length blocks of L bytes may be encrypted for each segment. When L is more than 20, each segment is at least L bits long, or L/8 bytes in length, since the segment delimiter is L bits long. For small L less than 20, the segment delimiter is 20 bits long, or 2.5 bytes. Note that the segment delimiter length K is in bits while the cipher block size L is in bytes. When block cipher engine 30 is a 128-bit AES cipher, L is 128/8=16 bytes.

Each initialization vector generated, and the segment delimiter P, are encrypted by block cipher engine 30' to generate encrypted metadata, which is added into cipher text file 38.

In some cases the segment delimiter may not be found in a very long sequence of bits from clear text file 36. A maximum segment size M may be imposed to limit the segment size. When sliding window 42 has processed M bytes without comparator 40 finding a match with the segment delimiter, a M-byte counter (not shown) may be triggered, causing the next segment signal to be activated. The last segments also does not typically end in the segment delimiter, but when the end of file for clear text file 36 is reached, the next segment signal may be activated or an end of file signal may be activated to cause block cipher engine 30' to encrypt all the initialization vectors and P, while block cipher engine 30 encrypts the remaining bytes from sliding window 42. Note that the last block in each segment typically has fewer than L bytes.

Figure 9:
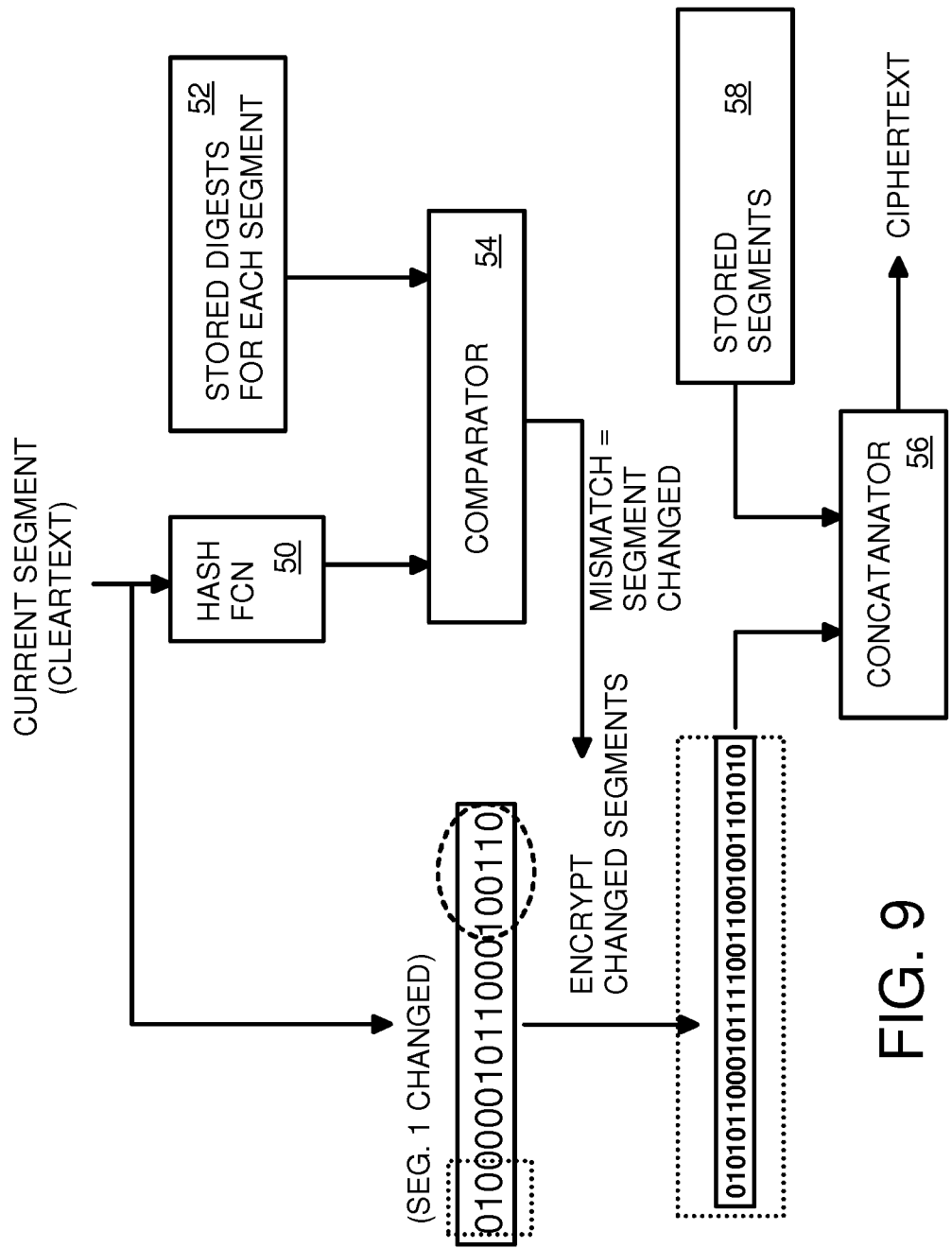
FIG. 9 is a block diagram of a re-encryptor for a changed segment.

FIG. 9 is a block diagram of a re-encryptor for a changed segment. During a re-encryption procedure, such as shown in FIG. 7, updated clear text is divided into segments by searching for the segment delimiter as described earlier. It is also necessary to identify when the current segment has changed and when the current segment has not been changed (updated). While all bits in the clear text for the current segment could be compared to the corresponding bits in the clear text for the original file, a faster method is to compare digests.

Hash function 50 uses a cryptographic hash function to generate a hash or digest from the clear text bits in the current segment. This updated digest has many fewer bits than does the segment. Digests for each segment may also be generated and stored as stored digests 52, either when the original file was encrypted, or more recently such as during the re-encryption process. The stored digests could also be stored as part of the encrypted metadata or re-generated from the old cipher-text during re-encryption.

Digest comparator 54 compares the updated digest from hash function 50 to the stored digest 52 for the same segment. When a match is found by comparator 54, the current segment has not been updated. The stored encrypted segment from stored segments 58 can be output for this segment.

When comparator 54 determines that the updated digest mis-matches the stored digest for the current segment, then the current segment has changed. Block cipher engine 30 is activated to encrypt one or more blocks in the current segment using a new initialization vector from the metadata. The newly encrypted segment is merged with unchanged stored segments by concatenator 56, which may be used to place the updated encrypted segments into the correct sequence with the original segments in the output cipher text. Alternately, only the updated segments may be output, along with some mapping or sequence information.

Figure 10:
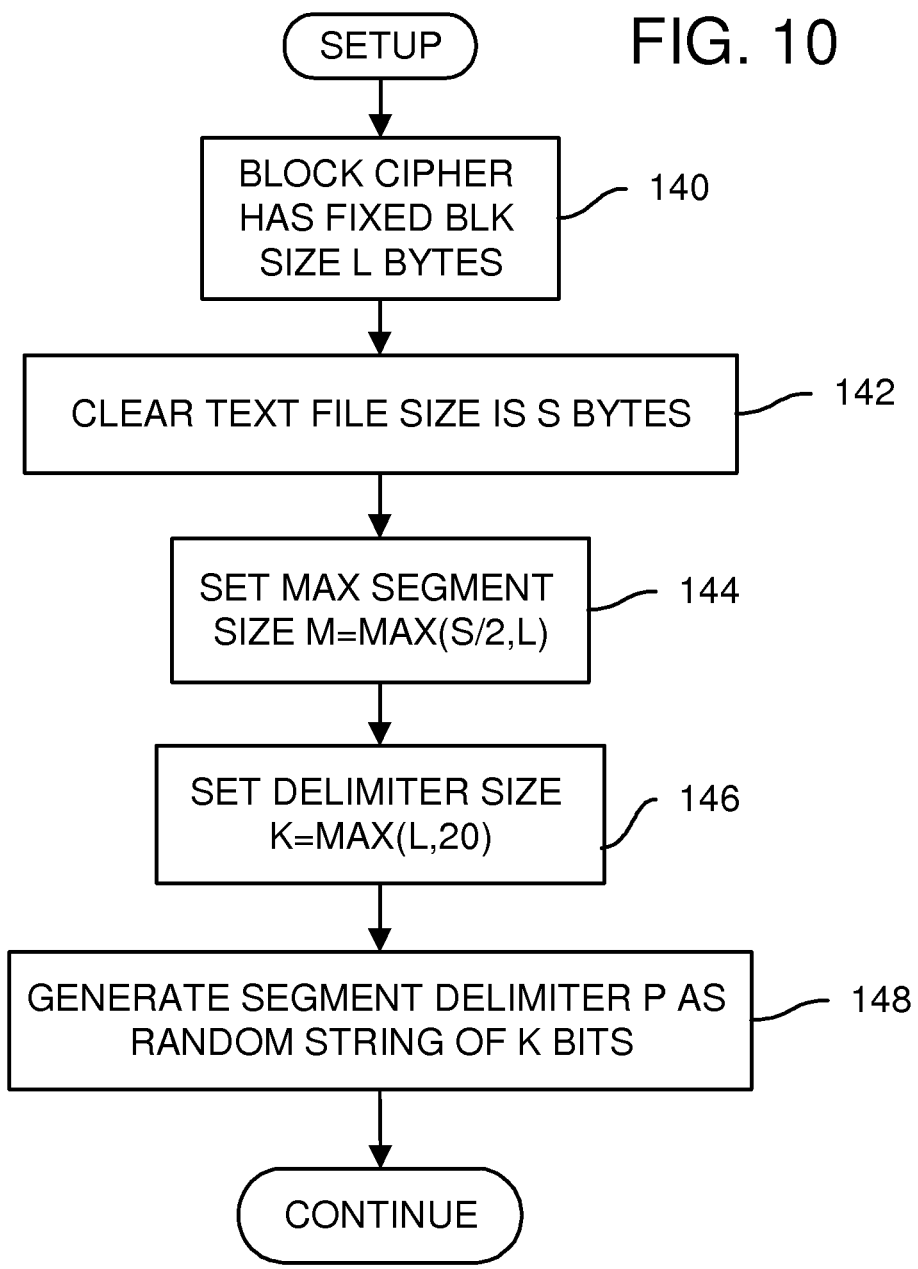
FIG. 10 is a flowchart of a setup process for an encryptor with variable-length segments and fixed-length blocks.

FIG. 10 is a flowchart of a setup process for an encryptor with variable-length segments and fixed-length blocks. The block cipher function is selected with a fixed size of L bytes, such as AES-128 with L=16 bytes, step 140. The size of the clear text file, S bytes, is also determined, step 142. The maximum segment size of the variable-length segments is also determined, step 144. The maximum segment size M is the maximum of L, S/2. For most files, the maximum segment size is half of the file size, but for very small files the maximum segment size is the block size L.

In step 146 the size of the segment delimiter is set. The delimiter size in bits, K, is the maximum of L, 20. Thus when L is 16 bytes, the delimiter size is 20 bits. When the block size L is 24 bytes, the delimiter size is 24 bits. Note that while L is in bytes, K is in bits.

Once the segment delimiter size K is determined, the segment delimiter itself may be generated, such as by a random number generator. In step 148 the segment delimiter P is generated as a randomly-generated string of K bits.

Figure 11A:
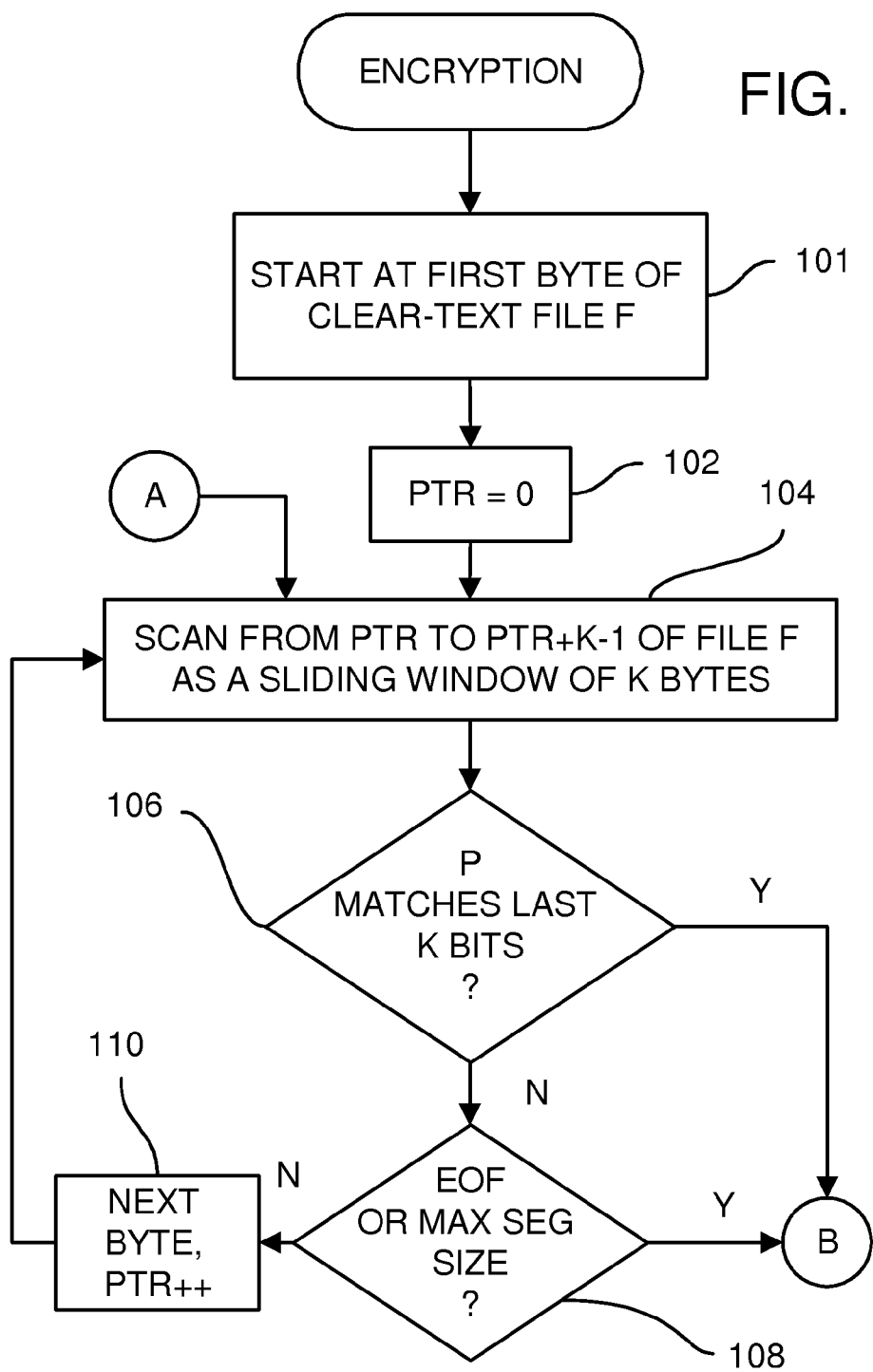
FIGS. 11A-B show an encryption process using variable-length segmentation and fixed-block encryption.
Figure 11B:
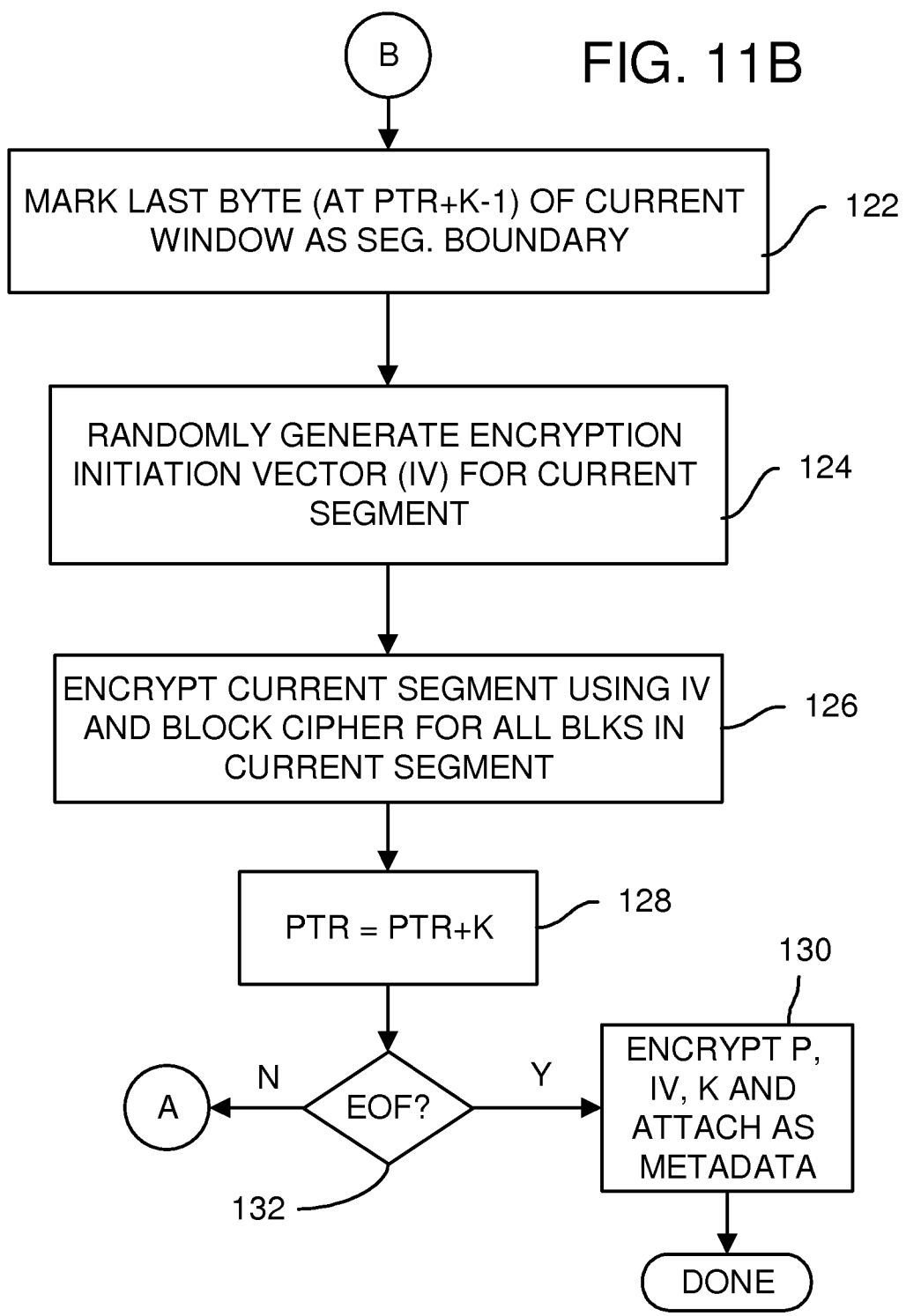

FIGS. 11A-B show an encryption process using variable-length segmentation and fixed-block encryption. The process begins at the first byte in a clear text file F, step 101. A pointer PTR is initialized to zero, step 102. The clear text file F is scanned from left to right as a sliding window of K bytes, from PTR to PTR+K−1, step 104. The current location of the sliding window is determined by pointer PTR.

The last K bits of the sliding window are compared to the K-bit segment delimiter P, step 106. If no match with the segment delimiter occurs, step 106, and the end of the clear text file is not reached, and the maximum segment length M is also not reached, step 108, then the pointer PTR is incremented, step 110, so that the next byte in clear text file F is scanned into the sliding window, step 104, and comparison with the segment delimiter repeated, step 106.

When the last K bits in the sliding window match the segment delimiter, step 106, or when the end of the clear text file F is reached, or when the maximum segment size M is reached, step 108, then the segment end has been reached. The process continues in FIG. 11B. The last byte in the sliding window is marked as the segment boundary, step 122. This last byte is the last byte in the current segment, at PTR+K−1, where K is in bytes. Note that the sliding window is advanced by a byte at a time, not a bit at a time, although matching is done with the K-bit segment delimiter. Thus the segment delimiter must be aligned to a byte boundary. When bits matching the segment delimiter occur in the clear text, but are not aligned to the byte boundary, these matching bits are ignored.

The initialization vector (IV) for the current segment is generated, step 124, if it was not generated earlier. Alternatively, an IV from a list of pre-generated IV's could be selected. The current block is encrypted using the selected or generated IV, step 126. The selected IV is input to a block cipher engine along with L bytes of clear text. The current segment may be longer that L blocks, in which case successive L-byte blocks are encrypted using the same initialization vector. The final part of the current segment may have fewer than L bytes, which are still encrypted as the last block in the current segment.

The pointer PTR is then advanced by K, the number of bytes in the sliding window, step 128. When the end of the clear text file has not yet been reached, step 132, then the process repeats from step 104 as the sliding window is reset to the start of the next segment.

When the end of the clear text file has been reached, step 132, the segment delimiter P, the number of bits K in the delimiter (which may be implicit from P), and all initialization vectors are encrypted as metadata, step 130. The encrypted metadata can be attached to the blocks of encrypted data generated in step 126 for all segments, or the encrypted metadata can be sent separately.

Figure 12C:
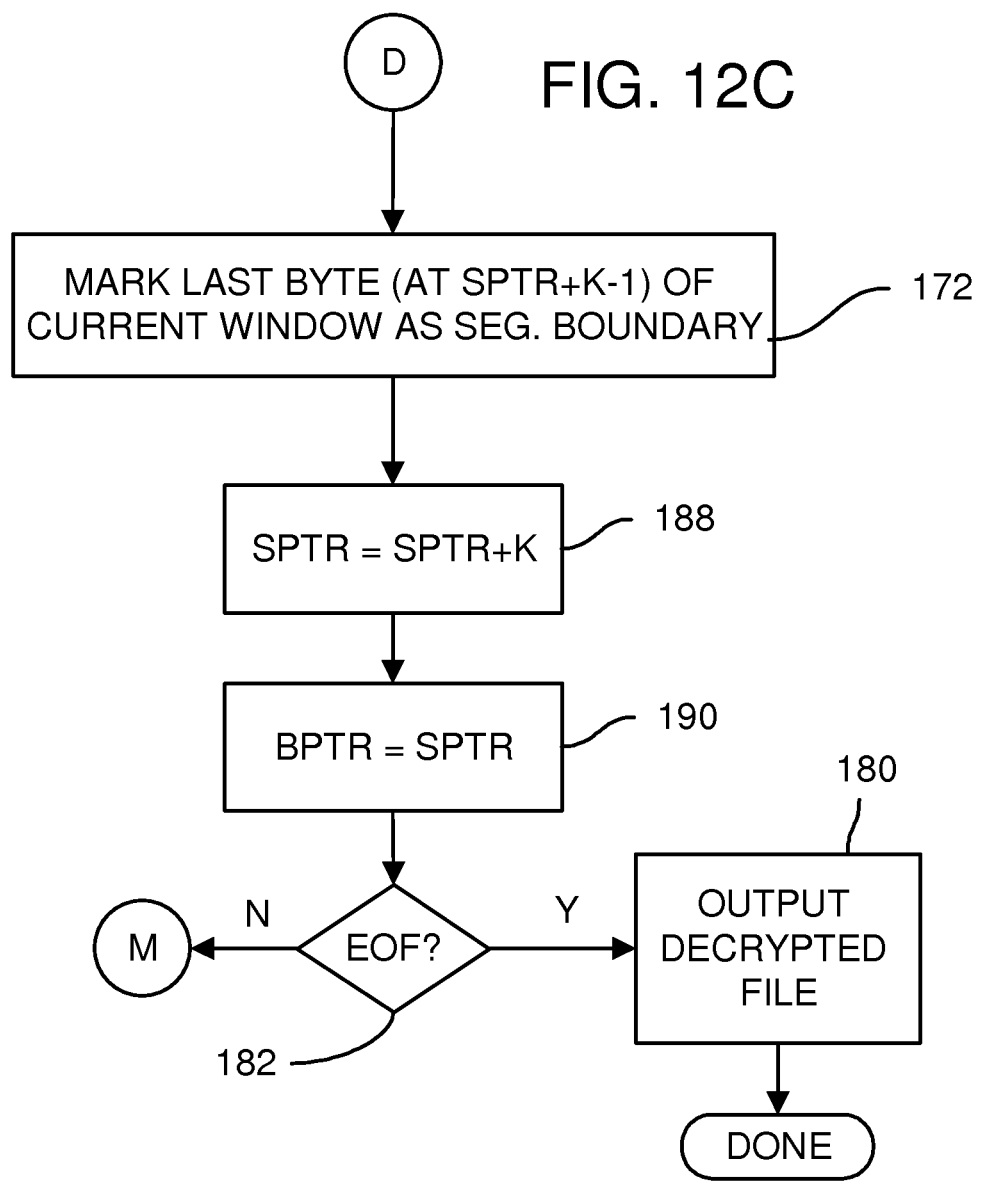

FIGS. 12A-C show a decryption process using variable-length segmentation and a fixed-block cipher. An encrypted file is received along with some metadata. The metadata is decrypted if necessary, and parsed for a list of initialization vectors (IV's) and the segment delimiter P, step 160.

The process begins at the first byte of an encrypted file, step 162. A segment pointer SPTR and a block pointer BPTR are both initialized to zero, step 164. A first initialization vector (IV) for a first segment is selected from a list of IV's from the metadata, step 166. One fixed-length encrypted block is decrypted using this IV, step 168, from block pointer BPTR to BPTR+L−1 in the encrypted file.

The block pointer BPTR is advanced by the block length L, step 169, once the L-byte block is decrypted. When the block pointer BPTR has not yet reached the end of the sliding window, SPTR+K−1, step 172, then another block needs to be decrypted to fill the sliding window, step 168. Once enough blocks have been decrypted to fill the sliding window, BPTR is greater than or equal to SPTR+K−1, step 172, and the process continues in FIG. 12B.

The sliding window that is loaded with the decrypted blocks from step 168 is scanned from left to right as a sliding window of K bytes, from segment pointer SPTR to SPTR+K−1, step 174. The current location of the sliding window is determined by segment pointer SPTR.

The last K bits of the sliding window are compared to the K-bit segment delimiter P, step 176. If no match with the segment delimiter occurs, step 176, and the end of the clear text file is not reached, and the maximum segment length M is also not reached, step 178, then the segment pointer SPTR is incremented, step 170, so that the next decrypted byte is scanned into the sliding window, step 174, and comparison with the segment delimiter repeated, step 176.

If there are not enough decrypted bytes for the sliding window, SPTR+K−1 is greater than BPTR, step 172, and another block needs to be decrypted to fill the sliding window, step 168. Once enough blocks have been decrypted to fill the sliding window, BPTR is greater than SPTR+K−1, step 172, and the process continues in FIG. 12B.

Once enough decrypted bytes are available in the sliding window, step 174, and the last K bits in the sliding window match the segment delimiter, step 176, or when the end of the encrypted file is reached, or when the maximum segment size M is reached, step 178, then the segment end has been reached. The process continues in FIG. 12C.

The last byte in the sliding window is marked as the segment boundary, step 172. The segment pointer SPTR is advanced by K, the size of the sliding window, step 188. The block pointer BPTR is advanced to match the segment pointer, step 190. When the end of the encrypted file has not yet been reached, step 182, then the process repeats from FIG. 12A, step 166, with the next initialization vector being selected from the list of IV's, and the next segment processed. When the end of the encrypted file has been reached, step 182, then the decrypted clear text file is output, step 180, by concatenating the decrypted data from the sliding window for all segments and all blocks in those segments.

Figure 13A:
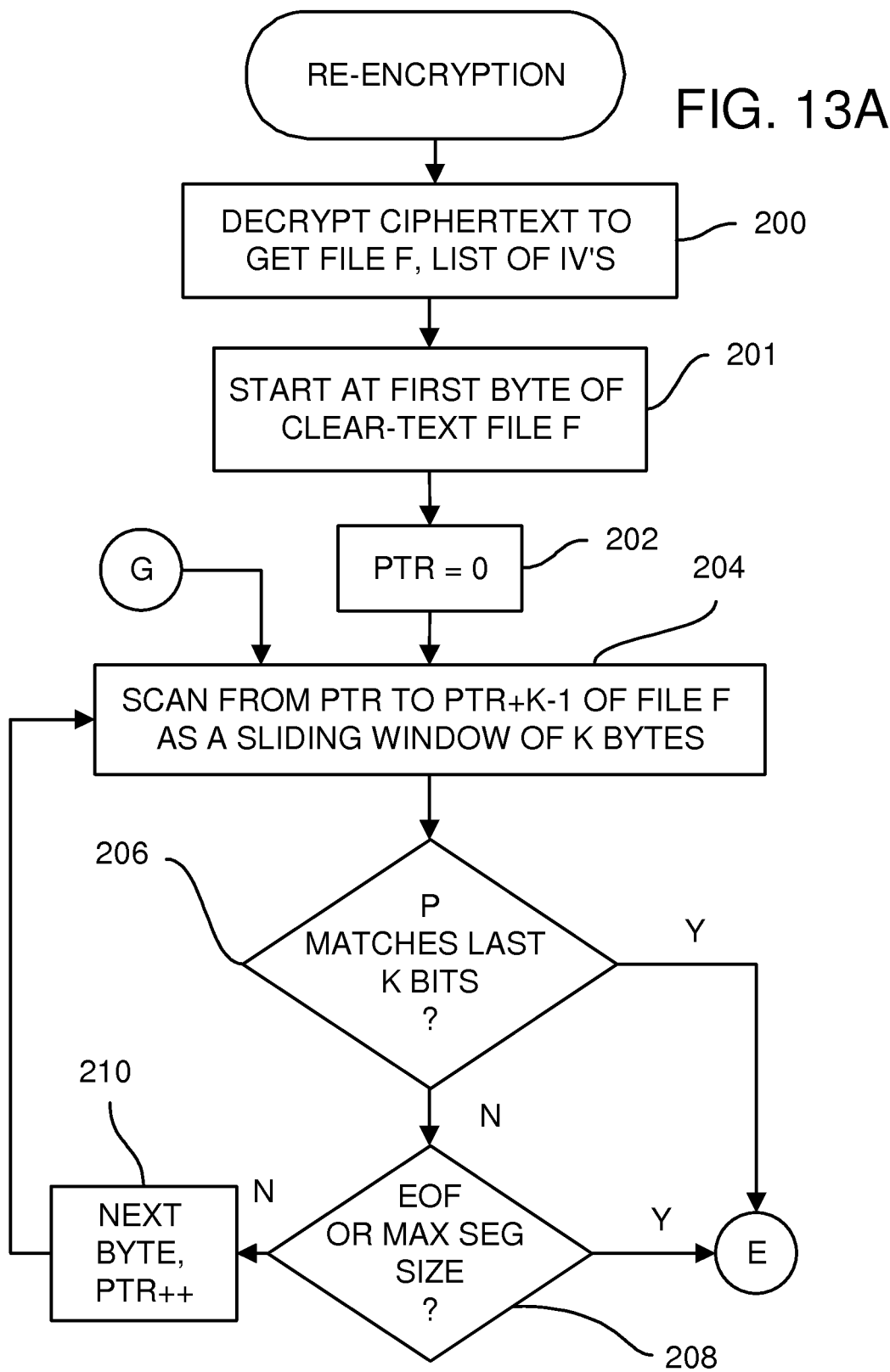

FIGS. 13A-E show a re-encryption process that detects updated segments using hash digests. In FIGS. 13A-B, an encrypted file is decrypted to obtain the original clear text, and then this original clear text is processed, segment-by-segment, to generate hashed digests for each segment.

Figure 13C:
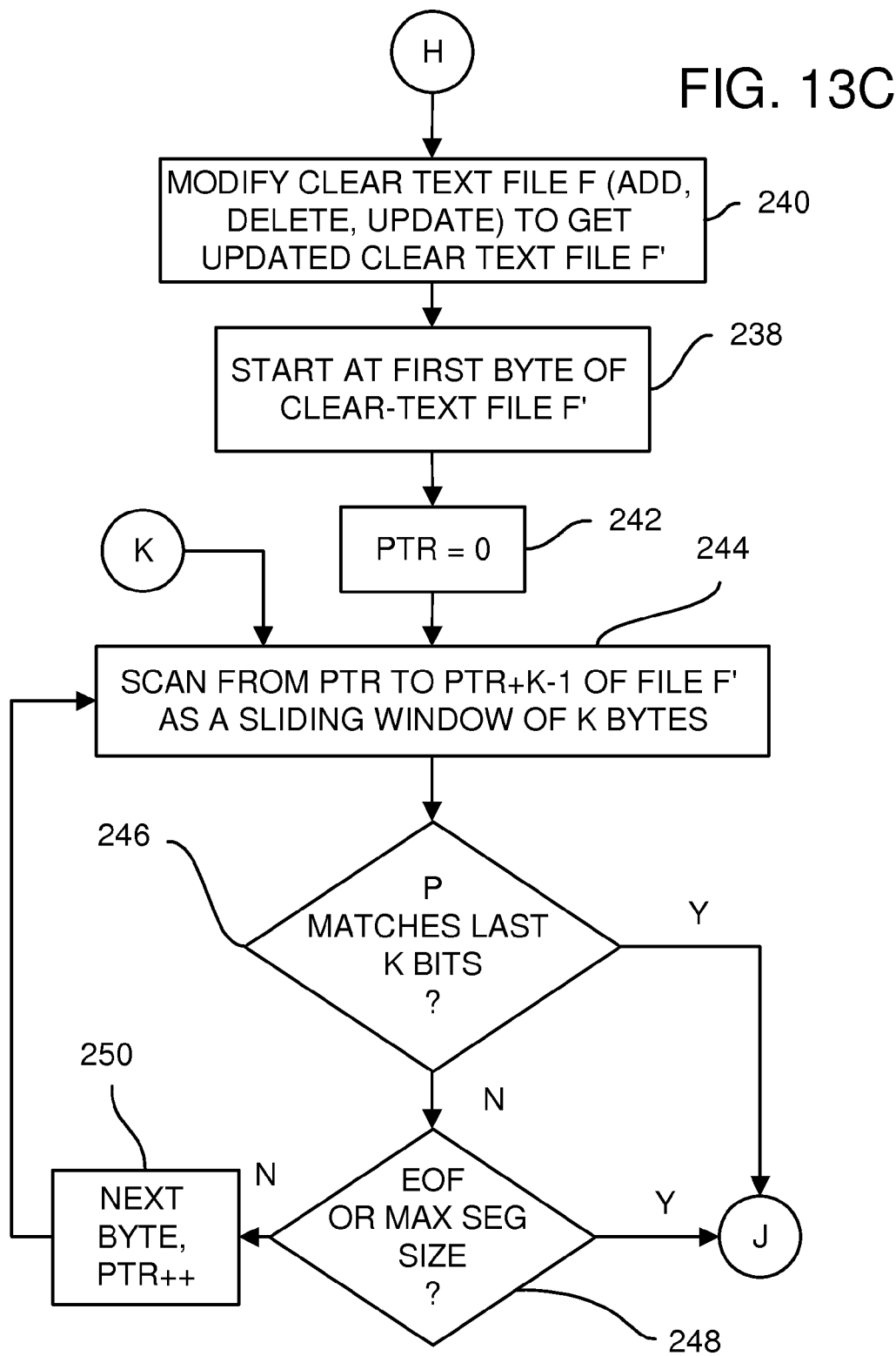
Figure 13D:
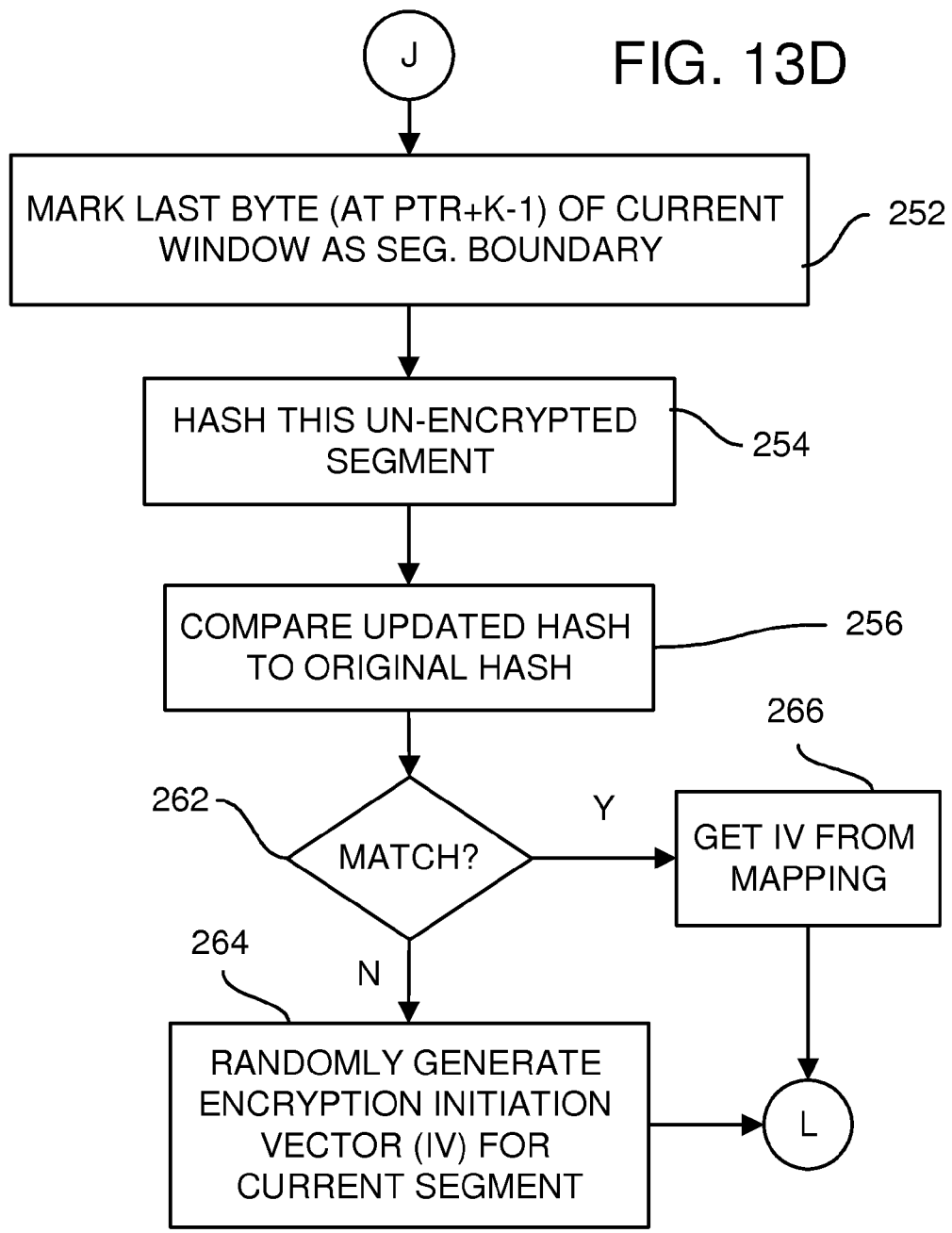

In FIG. 13C, the user updates a portion of the clear text. The updated clear text file is processed, segment-by-segment, to obtain hashes for each segment. In FIG. 13D, the new hash from the updated file is compared to the original hash from the original clear text file. When the hashes match, the old stored initialization vectors are used for matching segments. When the hashes mis-match, a new initialization vector is generated for the updated segment. In FIG. 13E, the updated segments are encrypted using the new initialization vectors, while old unchanged segments are encrypted using the original initialization vectors.

In FIG. 13A, an encrypted file is decrypted to reconstruct the original file F, step 200. The metadata for the original file is also obtained, such as by decrypting the metadata. The metadata contains a list of the initialization vectors that are needed to decrypt each segment.

Once the clear text is reconstructed for the original file F, hashes or digests are generated for each segment. If the hashes are stored in the metadata, or are otherwise available, such as in a local storage, the process may skip ahead to step 240, FIG. 13C.

The hash-generating process begins at the first byte in the reconstructed original clear text file F, step 201. A pointer PTR is initialized to zero, step 202. The reconstructed clear text file F is scanned from left to right as a sliding window of K bytes, from PTR to PTR+K-1, step 204. The current location of the sliding window is determined by pointer PTR.

The last K bits of the sliding window are compared to the K-bit segment delimiter P, step 206. If no match with the segment delimiter occurs, step 206, and the end of the reconstructed clear text file is not reached, and the maximum segment length M is also not reached, step 208, then the pointer PTR is incremented, step 210, so that the next byte in clear text file F is scanned into the sliding window, step 204, and comparison with the segment delimiter repeated, step 206.

When the last K bits in the sliding window match the segment delimiter, step 206, or when the end of the clear text file F is reached, or when the maximum segment size M is reached, step 208, then the segment end has been reached. The process continues in FIG. 13B. The last byte in the sliding window is marked as the segment boundary, step 222. This last byte is the last byte in the current segment, at PTR+K-1, where K is in bytes.

Once the end of the current segment has been reached, the clear text in the current segment is hashed to generate a digest, step 224. This original hash value is stored, such as by being mapped to the next initialization vector in the list of initialization vectors in the metadata, step 226.

The pointer PTR is then advanced by K, the number of bytes in the sliding window, step 228. When the end of the clear text file has not yet been reached, step 232, then the process repeats from step 204 as the sliding window is reset to the start of the next segment.

When the end of the clear text file has been reached, step 232, then hash digests have been generated for all segments from the original clear text file F.

In FIG. 13C, the user edits the clear text file F, such as by adding or deleting text or data in the file, or by updating data in the file, step 240. The updated file is updated clear text file F'. This updated clear text file is now processed to obtain updated hash digests and to compare them to identify which segments have changed and which segments have not changed.

The hash-generating process for the updated file F' begins at the first byte in the updated clear text file F', step 238. A pointer PTR is initialized to zero, step 242. The updated clear text file F' is scanned from left to right as a sliding window of K bytes, from PTR to PTR+K-1, step 244.

The last K bits of the sliding window are compared to the K-bit segment delimiter P, step 246. If no match with the segment delimiter occurs, step 246, and the end of the updated clear text file is not reached, and the maximum segment length M is also not reached, step 248, then the pointer PTR is incremented, step 250, so that the next byte in clear text file F' is scanned into the sliding window, step 244, and comparison with the segment delimiter repeated, step 246.

When the last K bits in the sliding window match the segment delimiter, step 246, or when the end of the clear text file F' is reached, or when the maximum segment size M is reached, step 248, then the segment end has been reached. The process continues in FIG. 13D. The last byte in the sliding window is marked as the segment boundary, step 252. This last byte is the last byte in the current segment, at PTR+K-1, where K is in bytes.

Once the end of the current segment has been reached, the updated clear text in the current segment is hashed to generate an updated digest, step 254. This updated hash value is compared to the original hash value, step 256. The original hash value was stored with the initialization vector of the next segment in step 226.

When the updated hash matches the original hash, step 262, then the current segment has not changed. The original initialization vector is read from the mapping or list of initialization vectors in the original metadata, step 266.

When the updated hash does not match the original hash, step 262, then the current segment has changed. The current segment may be marked as updated or changed. A new initialization vector is generated for this updated segment, step 264.

In FIG. 13E, the initialization vector has already been obtained, either the original IV for an unchanged segment, or a new IV for an updated segment. This IV is used by the block cipher engine to encrypt all blocks in the current segment, step 268. The pointer PTR is then advanced by K, the number of bytes in the sliding window, step 258. When the end of the updated clear text file F' has not yet been reached, step 270, then the process repeats from step 244 as the sliding window is reset to the start of the next segment.

When the end of the updated clear text file has been reached, step 270, the segment delimiter P, the number of bits in the delimiter K, and all initialization vectors are concatenated in sequence as metadata, step 272. All mappings of initialization vectors are destroyed for security, step 274. The encrypted metadata can be attached to the blocks of re-encrypted data generated in step 268 for all segments, step 276, or the encrypted metadata can be sent separately.

The process of FIGS. 13A-E could be used to generate the updated cipher text string. As a post-processing procedure on the local computer or on a local server, the updated cipher text string could be compared to the original cipher text string to locate changes. Then just the changed characters in the updated cipher text string could be transmitted over the Internet to a remote encrypted storage, along with an indicator of the locations of the changed characters within the original cipher text string. The indicator could be a sequence number that indicates the order of the changed character(s), or could be an address or a string of characters just before the updated character.

Alternate Embodiments

Several other embodiments are contemplated by the inventors. For example the various operations and functions could be pipelined and performed in parallel. Buffering and pipelining registers or delays could be added. The segment marker at the segment boundary does not have to be an actual marker but could be used to signal other processes or functions. The segment marker does not have to be saved.

The values of various parameters have been shown or described as examples. Parameters may have other values that those described. The segment delimiter P could have a different lower minimum than 20, such as 16, 40, or other values. While the segment delimiter length K is described as being the maximum of L or 20, where L is the block size in bytes, and K is the length in bits, other functions could be used. K could be the maximum of 20 and L/2, or the maximum of 16 and L*3, etc. While the segment delimiter has been described as being generated once for each clear text file 36, a different segment delimiter could be used for each segment, or for groups of segments, with each segment delimiter P being saved as metadata.

The size of segment delimiter affects average segment size. Assuming a K-bit segment delimiter S, and given a random byte string M which has size larger than K bit (1 byte=8 bit), the probability of S matching the last K bits of M is $2^K$, i.e., on average it slides the window $2^K$ times before having a match. If K is 20, the average size will be around 1 Mega bytes since the window slides byte by byte. Now if the length of segment delimiter S is K-byte long, the probability of matching will become $2^{8K}$ and the average size will become enormous, which is unrealistic.

While block cipher engine 30 has been described as using an AES-128 cipher, other encryption methods and standards could be used, such as AES-256 or DES, as could other values of L, the block size. While a fixed-length block has been described for most blocks, the last block in each segment, and in the file, is typically less than the fixed size in length. Filler data such as all zeros or all ones may be added as filler data or padding to reach the fixed size, such as 128 bits, for these partial-length end blocks.

While a cryptographic hash function has been described for hash function 50, other digest-generating functions could be used, such as a cyclical-redundancy-check (CRC), or Fletcher-32. The size of the digest should be large enough to prevent a high probability of aliasing that could cause too many unchanged segments to be processed as changed segments, or could cause updated segments to be incorrectly identified as an unchanged segment.

One original segment may be updated so that an additional occurrence of the segment delimiter is present in the updated segment. Then the original segment maps to two updated segments. Alternately, the update could remove or move the segment delimiter so that two original segments are updated to one updated segment. More than two segments could also be combined or divided. Digest matching correctly accounts for these situations.

A list of initialization vectors could be included in the metadata, with a mapping table or pointers to associate each segment with its initialization vector. The original sequence of segments may be indicated by a sequence number, or by a mapping table that indicates the order within a sequence for each segment entry. A linked list or pointers to the next segment could also be employed. The metadata may include such sequence information in whatever form is used, or in some other form. Various encodings may be used as may various data formats.

While a single initialization vector has been described for each segment, more than one initialization vector could be used by a segment. Block cipher engine 30 could have inputs for two or more initialization vectors. Multiple initialization vectors may be merged or concatenated to form a longer initialization vector.

When bits matching the segment delimiter occur in the clear text, but are not aligned to the byte boundary, these matching bits are ignored. In an alternative embodiment, the sliding window could slide by one bit at a time rather than by one byte at a time, and then the segment delimiter could match any K-bit sequence rather than only byte-aligned K-bit sequences. The pointer could also be advanced by another amount, such as by 4 bytes, requiring that the segment delimiter be aligned to a 32-bit word boundary. Other alternatives may be substituted.

While the benefit of efficient re-encryption for a remote storage has been described, the more efficient updated cipher text may not only reduce bandwidth required to send and receive updates, but may also improve wear and the lifetime of storage systems. For example, by updating a smaller amount of data on the storage system, the storage may receive less wear. Some storage systems such as flash-memory-based storage may have a limited number of write-erase cycles that are allowed, so such storage systems may benefit from the invention.

It is important that the amount of changed cipher text not be so small as to compromise the security of the encryption system. While a change of just a few characters in the cipher text is shown for illustrative purposes in FIG. 2, in reality the change is many characters in length, although still much smaller than the entire document. The encryption system is designed so that the avalanche effect is triggered to defend against entropy-related crypt-analysis. The re-encryption method can be implemented such that a change of just one bit of clear text will produce a change in cipher text of at least 64 bits, which is half of a 128-bit AES cipher block.

Various other conversions or mappings besides ASCII may be employed for conversion between character strings and the bit stream. Scrambling and unscrambling may be added. The metadata could be separately transmitted from the encrypted data, or could be combined with the encrypted message data. The metadata might not be encrypted. Clear text 10 or cipher text 12 might be a raw bit stream rather than characters so that no conversion between character and bit-stream format is needed. While the terms clear text and cipher text have been used, these terms are not intended to be restricted to ASCII text or characters, but may include raw bits or data in any format.

While comparing bits in the segment delimiter to a bit stream is described, the segment delimiter could be expressed as a character string, which is compared to characters in the clear text file. While the segment boundary is set at the end of the bits matching the segment delimiter, there could be an offset from the bits matching the segment delimiter to the segment boundary, such as having the segment end 10 bytes after the matching bits, or just before the matching bits.

The metadata transmitted over a non-secure channel does not include the number of bits in each segment to maintain security of the segments, which instead must be delimited by matching the segment delimiter. The updated or changed segment may use the same initialization vector as the original segment, or may use a new initialization vector that would be sent as updated metadata with the updated encrypted segment.

The process steps may be implemented by a hardware device such as a controller or an array of logic gates, or an encryption engine. A processor may execute instructions in firmware or in a semiconductor memory such as a dynamic-random-access memory (DRAM), static random-access memory (SRAM), or electrically-erasable programmable read-only memory, (EEPROM) or flash memory, or a hard-wired ROM. Instructions for routines may be copied from a mass storage device to the semiconductor memory for execution by the hardware.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A variable-segment fixed-block encryption device comprising:
   an input for receiving a clear text;
   a sliding window that selects a sliding portion of the clear text;
   a comparator that compares a segment delimiter to clear text in the sliding window to detect a segment boundary;
   a block cipher engine that receives a block of bits of the clear text, the block cipher engine also receiving an initialization vector that adjusts an encryption function used by the block cipher engine to generate a block of cipher text from the block;
   an initialization vector generator that generates initialization vectors, wherein a different initialization vector is generated for each segment of the clear text;
   a selector that inputs a different initialization vector to the block cipher engine when the comparator detects the segment boundary;
   a segment comparator that compares an original current segment from an original clear text file to a current updated segment from an updated clear text file to signal a changed segment when the current updated segment has changed from the original current segment;
   a re-encryptor that activates the block cipher engine to encrypt blocks within the changed segment when the segment comparator has signaled the changed segment;
   wherein the block cipher engine is not activated for segments when the segment comparator does not signal the changed segment;
   whereby changed segments are re-encrypted; and
   an output receiving the blocks of cipher text from the block cipher engine as an encryption of the clear text,
   wherein initialization vectors are changed for each segment boundary.

2. The variable-segment fixed-block encryption device of claim 1 wherein the segments have a variable length that varies from one segment to another segment;
   wherein a terminal block at a segment boundary in a segment has L or fewer bits of the clear text and other blocks not at the segment boundary have exactly L bits of clear text;
   wherein L is a whole number of at least 64;
   wherein the other blocks have a fixed length;
   whereby variable-length segments located by matching the segment delimiter are encrypted by blocks with initialization vectors changed at segment boundaries.

3. The variable-segment fixed-block encryption device of claim 1 further comprising:
   a random number generator that generates the segment delimiter as a K-bit random number;
   wherein the sliding window selects at least K bytes of the clear text;
   wherein K is a whole number of at least 20.

4. The variable-segment fixed-block encryption device of claim 1 wherein the initialization vector generator comprises a random number generator for randomly generating the initialization vectors.

5. The variable-segment fixed-block encryption device of claim 1 wherein the block cipher engine comprises an Advanced Encryption Standard 128-bit (AES-128) encryptor that encrypts a block of 128bits using the initialization vector as a control vector input.

6. The variable-segment fixed-block encryption device of claim 1 further comprising:
   a metadata collector that collects the segment delimiter and the initialization vectors as metadata, the metadata being transmitted to an authorize receiver of the encryption of the clear text,
   whereby the segment delimiter is included in the metadata.

7. The variable-segment fixed-block encryption device of claim 1 wherein the segment comparator comprises:
   a hash engine for generating an original hashed digest of the original current segment from an original clear text file, and for generating an updated hashed digest of the current updated segment from the updated clear text file; and
   a digest comparator that compares the original hashed digest to the updated hashed digest to signal the changed segment,
   whereby hashed digests are generated and compared for each segment.

8. A method for encrypting a clear text file comprising:
   generating a segment delimiter using an electronic computing device;
   scanning the clear text file for matching bits that match the segment delimiter, and locating a segment boundary when the matching bits are found;
   dividing the clear text file into segments at the segment boundaries located by matching the segment delimiter, wherein segments have a variable length;
   selecting an initialization vector for each segment, wherein a different initialization vector is used for each segment;
   dividing each segment into a plurality of blocks, each block having a fixed number of bits except for an end block in each segment which has a number of bits that is less than or equal to the fixed number of bits;

for each block in each segment, inputting a block from a current segment into a block cipher engine, and inputting the initialization vector for the current segment to the block cipher engine, and activating the block cipher engine to generate a cipher block of cipher text that is a function of the initialization vector for the current segment and of the block from the current segment;

when a maximum segment size is reached and the segment delimiter is not matched, indicating a segment boundary to divide the segment with the maximum segment size and starting a new segment;

when an end of the clear text file is reached, indicating a segment boundary to divide the segment;

encrypting the initialization vectors and the segment delimiter as encrypted metadata that is output for use with a cipher text file; and outputting the cipher blocks generated by the block cipher engine into the cipher text file, and outputting the initialization vectors and the segment delimiter as encrypted metadata for the cipher text file, whereby variable-length segments are encrypted using different initialization vectors input to the block cipher engine that encrypts fixed-size blocks within the segments.

9. The method of claim 8 further comprising:
storing in a semiconductor memory the cipher blocks generated by the block cipher engine, wherein the cipher text file is stored in the semiconductor memory after encryption of the clear text file.

10. The method of claim 9 further comprising:
generating an original digest of the current segment, the original digest being a hash function or a cyclical-redundancy-check (CRC) function of clear text in the current segment;

receiving an updated clear text file that partially changes the clear text file;

scanning the updated clear text file for matching bits that match the segment delimiter, and locating an updated segment boundary when the matching bits are found;

dividing the updated clear text file into updated segments at the updated segment boundaries located by matching the segment delimiter, wherein updated segments have a variable length;

generating an updated digest of a current updated segment, the updated digest being a hash function or a cyclical-redundancy-check (CRC) function of updated clear text in the current updated segment;

comparing the updated digest to the original digest, and indicating that the current updated segment is a changed segment when the updated digest does not match the original digest, and indicating that the current updated segment is an un-changed segment when the updated digest does matches the original digest;

selecting an updated initialization vector for each changed segment, wherein a different initialization vector is used for each segment;

dividing each changed segment into a plurality of blocks, each block having a fixed number of bits except for an end block in each changed segment which has a number of bits that is less than or equal to the fixed number of bits;

for each block in each changed segment, inputting a block from the changed segment into the block cipher engine, and inputting the updated initialization vector for the changed segment to the block cipher engine, and activating the block cipher engine to generate a changed cipher block of cipher text that is a function of the updated initialization vector for the changed segment and of the block from the changed segment; and outputting the changed cipher blocks generated by the block cipher engine into a changed cipher text file, and outputting the updated initialization vectors and the segment delimiter as metadata for the changed cipher text file, whereby changed segments are located by comparing digests.

11. The method of claim 10 wherein the updated clear text file comprises at least 10 segments;
wherein a single-byte change in the updated clear text file results in only one changed segment, wherein all other segments are un-changed segments,
whereby a small change to the updated clear text file produces a single changed segment that requires encryption, wherein un-changed segments in the updated clear text file do not require encryption.

12. The method of claim 10 further comprising generating the clear text file from an encrypted file by:
initializing a segment pointer;
initializing a block pointer;
reading a current initialization vector from a list of initialization vectors;
decrypting a block from the encrypted file using the block cipher engine to load decrypted clear text into a sliding window;
incrementing the block pointer by a size of the block;
decrypting additional blocks from the encrypted file and incrementing the block pointer by a size of the blocks decrypted and loading decrypted clear text into the sliding window until the block pointer is greater than the segment pointer plus a window size;
scanning the decrypted clear text in the sliding window for matching bits that match the segment delimiter, and locating a segment boundary when the matching bits are found;
incrementing the segment pointer when the sliding window is scanned and the segment boundary is not reached;
incrementing the segment pointer by the window size when the segment boundary is reached, and copying the segment pointer to the block pointer; and
outputting the decrypted clear text as the clear text file.

13. A segmenting block-encryptor comprising:
an input receiving input data for encryption;
sliding means for selecting a window of data from the input data, wherein the window of data selects input data in a sequence;
delimiter means for comparing input data in the window of data to a segment delimiter and indicating a segment boundary when a match with the segment delimiter is found;
block cipher means for generating a cipher block from a block of the input data using an encryption function that depends on an initialization vector;
initialization means for generating a plurality of initialization vectors, wherein a different initialization vector is applied to the block cipher means after each segment boundary is detected by the delimiter means;
digest means for generating a compressed digest of a segment, the compressed digest having a fewer number of bits than the input data in the segment;
digest compare means for comparing the compressed digest for an updated segment to a compressed digest for an original segment to determine when the updated segment has not changed from the original segment;

wherein each segment has a variable length of the input data and comprises a plurality of blocks when the segment's length is greater than a fixed block length of the block;

wherein all blocks have the fixed block length of the input data except for terminal blocks at an end of the segment by the segment boundary that have a length less than the fixed block length; and output means for outputting encrypted data generated by the block cipher means, whereby input data is encrypted in blocks by initialization vectors are changed at segment boundaries of variable-length segments.

14. The segmenting block-encryptor of claim 13 wherein the fixed block length is L bytes, wherein L is a whole number of at least 8;

random means for generating the segment delimiter as a random number of K bits, where K is a whole number of at least 20, and K is equal to L when L is greater than 20.

15. The segmenting block-encryptor of claim 14 further comprising:

maximum means for generating a segment boundary when a maximum segment size has been reached without the segment delimiter being found;

wherein the maximum segment size is at least the fixed block length L; and wherein the maximum segment size is no more than half of a file size of the input data.

16. The segmenting block-encryptor of claim 14 further comprising:

segment pointer means for indicating a location within a sequence of the input data that is selected by the sliding means for inclusion in the window;

segment pointer advancing means for advancing the segment pointer means by a size of the window when the segment boundary is reached, and for incrementing the segment pointer means when a match with the segment delimiter is not found for a current set of input data in the window.

17. The segmenting block-encryptor of claim 16 further comprising:

block pointer means for indicating a location within the sequence of the input data that is input to the block cipher means for encryption or decryption;

block pointer advancing means for advancing the block pointer means by a size of the block when the block cipher means has encrypted or decrypted a block;

boundary advancing means for copying a value of the segment pointer means to overwrite the block pointer means when the segment boundary is reached.

* * * * *